United States Patent [19]

Chamberlin et al.

[11] Patent Number: 4,817,127

[45] Date of Patent: Mar. 28, 1989

[54] MODULAR DICTATION/TRANSCRIPTION SYSTEM

[75] Inventors: David B. Chamberlin, Milford; John J. Dwyer, Stratford; Suzanne N. Grey, Springdale; Emil F. Jachmann, Greenwich; Jeremy Saltzman, Norwalk, all of Conn.

[73] Assignee: Dictaphone Corporation, Stratford, Conn.

[21] Appl. No.: 895,006

[22] Filed: Aug. 8, 1986

[51] Int. Cl.$^4$ .................. H04M 1/64; H04M 11/10
[52] U.S. Cl. .......................... 379/67; 369/27; 369/29; 379/70; 379/75; 379/110; 379/436
[58] Field of Search .............. 379/67, 68, 69, 70, 379/71, 72, 73, 74, 75, 76, 77, 78, 79, 80-88, 90, 110, 387, 419, 427, 428, 436, 442; 369/25, 26, 27, 28, 29

[56] References Cited

U.S. PATENT DOCUMENTS

| | | | |
|---|---|---|---|
| 3,433,428 | 3/1969 | Schatteman | 192/53 H |
| 3,467,790 | 9/1969 | Bolick, Jr. | 360/71 |
| 3,635,424 | 1/1972 | Morello | 242/68.3 |
| 3,758,726 | 9/1973 | Bolick, Jr. et al. | 242/198 |
| 3,779,498 | 12/1973 | Takashino | 242/204 |
| 3,823,388 | 7/1974 | Chadima, Jr. et al. | 379/93 X |
| 3,834,651 | 9/1974 | Hashizume et al. | 242/199 |
| 3,842,433 | 10/1974 | Lemelson | 360/105 |
| 3,879,586 | 4/1975 | DuRocher et al. | 200/5 A |
| 3,885,108 | 5/1975 | Zock | 379/32 |
| 3,896,493 | 7/1975 | Ando | 360/96 |
| 3,903,369 | 9/1975 | Darwood | 379/77 |
| 3,914,551 | 10/1975 | Hunt | 379/79 |
| 3,916,103 | 10/1975 | Morrell et al. | 379/428 |
| 3,916,121 | 10/1975 | Stuzzi | 360/13 |
| 3,920,926 | 11/1975 | Lenaerts et al. | 379/93 |
| 3,974,338 | 8/1976 | Luzier et al. | 379/72 X |
| 3,999,050 | 12/1976 | Pitroda | 364/419 |
| 4,007,491 | 2/1977 | Bolick, Jr. et al. | 360/74 |
| 4,046,973 | 9/1977 | Sato | 369/5 |
| 4,057,839 | 11/1977 | Banks | 360/93 |
| 4,071,698 | 1/1978 | Barger, Jr. et al. | 379/84 |
| 4,113,994 | 9/1978 | Bolick, Jr. et al. | 369/26 |
| 4,115,846 | 9/1978 | Laine | 364/200 |
| 4,617,425 | 10/1986 | Nakamura et al. | 379/77 |
| 4,722,077 | 1/1988 | Jachmann et al. | 369/25 |

(List continued on next page.)

FOREIGN PATENT DOCUMENTS

| | | |
|---|---|---|
| 0088331 | 9/1983 | European Pat. Off. |
| 3307169 | 9/1984 | Fed. Rep. of Germany ........ 379/88 |
| 1467675 | 3/1977 | United Kingdom . |
| 2109144 | 5/1983 | United Kingdom . |
| 2171575 | 7/1986 | United Kingdom . |
| 2183397 | 6/1987 | United Kingdom . |

OTHER PUBLICATIONS

Hansbauer et al, "Modulor Telephone User Equipment Line", Telefon Report 9 (1973) Nos. 2-3, pp. 73-83.
Jansen, "KT20 Multi-function Telephone Terminals", Phillips Telecomm. Review, vol. 40, No. 4, Dec. 1982 pp. 327-336.
Cygnet Communications CoSystem; Cygnet Technologies, Inc. brochure, undated.
The Zymacom Information Exchange; Zymacom, Inc. brochure, 1985.

*Primary Examiner*—Thomas W. Brown
*Attorney, Agent, or Firm*—Robert H. Whisker; Melvin J. Scolnick; David E. Pitchenik

[57] ABSTRACT

A modular dictation/transcription system is described comprising a modular construction wherein the system is composed of a set of modules which are detachably connectable to each other. Connection or detachment of individual modules from the system configures the system to provide such functions as may be required while deleting such functions which are not necessary. Included within the modules are one or more recording/playback modules a display module and a telephone module. All of the modules interact with each other in accordance with preselectable functions to provide for a more efficient utilization of the dictation/transcription system. Clusters of the modules may be arranged as stations, with the stations connected by a digital communication link.

21 Claims, 7 Drawing Sheets

U.S. PATENT DOCUMENTS

| | | | |
|---|---|---|---|
| 4,212,438 | 7/1980 | Schatteman | 242/201 |
| 4,263,481 | 4/1981 | Ho et al. | 379/80 |
| 4,291,198 | 9/1981 | Anderson | 379/96 |
| 4,306,117 | 12/1981 | Jacobson | 379/76 |
| 4,317,143 | 2/1982 | Osanai | 360/74.1 |
| 4,375,584 | 3/1983 | Mozumdor et al. | 379/428 |
| 4,378,917 | 4/1983 | Negishi et al. | 242/186 |
| 4,422,114 | 12/1983 | Sugihara | 360/96.4 |
| 4,425,627 | 1/1984 | Eibner | 364/900 |
| 4,482,085 | 11/1984 | Tanaka et al. | 226/187 |
| 4,488,274 | 12/1984 | Plunkett, Jr. | 379/75 X |
| 4,503,288 | 3/1985 | Kessler | 379/67 |
| 4,517,410 | 5/1985 | Williams et al. | 379/73 |
| 4,524,244 | 6/1985 | Faggin et al. | 379/93 |
| 4,581,495 | 4/1986 | Geri et al. | 379/440 |

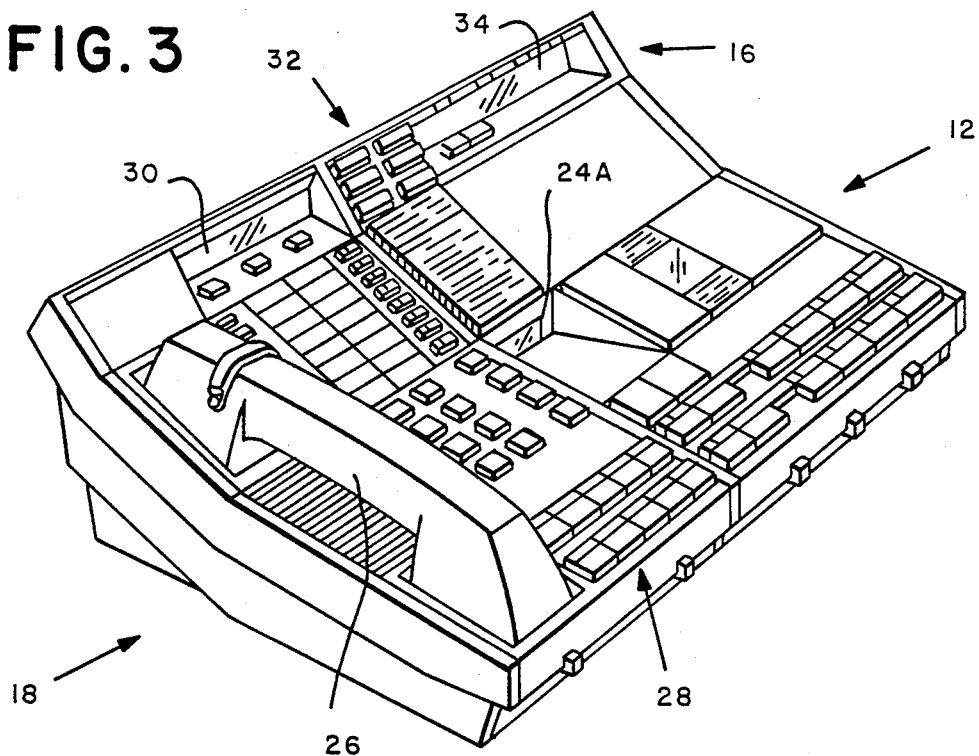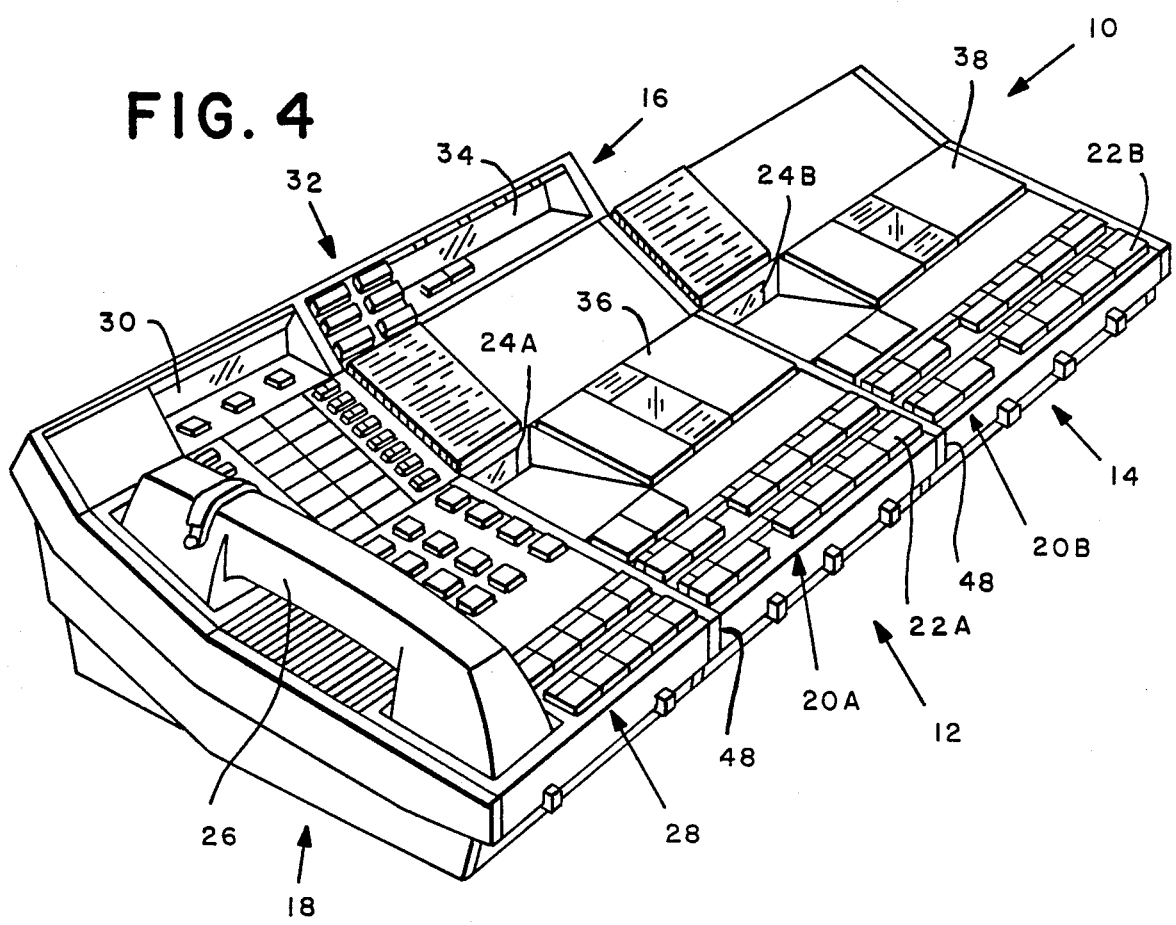

FROM CIRCUIT 68

TO SWITCHES 62

MODULAR DICTATION/TRANSCRIPTION SYSTEM

RELATED APPLICATIONS

1. U.S. patent application Ser. No. 894,993, Filed: Aug. 8, 1986, Titled: DISPLAY FOR MODULAR DICTATION/TRANSCRIPTION SYSTEM, By: J. Dwyer et al
2. U.S. patent application Ser. No. 894,583, Filed: Aug. 8,1986, Titled: DISPLAY FOR MODULAR DICTATION/TRANSCRIPTION SYSTEM, By: J. Dwyer et al
3. U.S. patent application Ser. No. 894,582, Filed: Aug. 8,1986, Titled: DESCRIPTIVE DATA BLOCK FOR A RECORDED AUDIO MESSAGE, By: J. Dwyer et al
4. U.S. patent application Ser. No. 895,011, Filed: Aug. 1, 1986, Titled: DISPLAY FOR MODULAR DICTATION/TRANSCRIPTION SYSTEM, By: J. Dwyer et al
5. U.S. patent application Ser. No. 895,017, Filed: Aug. 8, 1986, Titled: PROGRAMABLE TELEPHONE/DICTATION TERMINAL AND METHOD OF OPERATING SAME, By: N. D'Agosto et al
6. U S. patent application Ser. No. 895,010, Filed: Aug. 8, 1986, Titled: COMMUNICATIONS NETWORK AND METHOD, By: D. Chamberlin et al
7. U.S. patent application Ser. No. 894,992, Filed: Aug. 8, 1986, Titled: COMMUNICATIONS NETWORK AND METHOD WITH VISIBLE AND VOICE MESSAGE TRANSMISSION CAPABILITIES, By: D. Chamberlin et al
8. U.S. patent application Ser. No. 894,549, Filed: Aug. 8, 1986, Titled: "C" SPEAKERPHONE MUTE CAPABILITY, By: N. D'Agosto et al
9. U.S. patent application Ser. No. 895,002, Filed: Aug. 8, 1986, Titled: COMMUNICATIONS NETWORK AND METHOD WITH APPOINTMENT INFORMATION COMMUNICATION CAPABILITIES, By: D. Chamberlin el al
10. U.S. patent application Ser. No. 895,001, Filed: Aug. 8, 1986, Titled: METHOD AND APPARATUS FOR CREATING AND STORING TELEPHONE DIRECTORY LISTINGS, By: N. D'Agosto et al.

BACKGROUND OF THE INVENTION

I. Field of the Invention

This invention relates to dictation/transcription systems for the recording and retrieval of message related signals such as voice signals and, more particularly, to a desktop dictation/transcription system of modular construction wherein individual modules having various features can be connected to or disconnected from the system to provide such functions as may be required to create different configurations of a desktop dictation/transcription system or a network of desktop dictation/transcription systems.

II. Description of the Prior Art

A variety of equipment is presently available for the recording and/or playback of messages such as voice and music. Examples of such equipment include tape recorders, a telephone answering system providing for the storage of incoming messages and the transmission of outgoing messages, numerous types of apparatus for the dictation and/or transcription of voice messages, etc. In the field of dictation equipment a long standing problem relates to each known apparatus being basically an entity unto itself, i.e., once the apparatus is bought by the user there is no way to expand it or have it grow to give the user materially different features and functions. Basically, the only known way to accomplish this is to trade one's existing machine in, and buy another machine. A practical problem thus arises in that, while the dictation/transcription needs of office personnel may vary, presently available dictation/transcription equipment is limited to specific sets of functions, and therefore can only satisfy certain needs. Separate dictation/transcription devices must be purchased to perform individual sets of functions. This not only becomes very expensive, but these devices operate individually without cooperating with each other. Furthermore, an individual device may provide certain functions which the user does not require along with the required functions. In any event, the dictation/transcription equipment may not be as well matched to the particular needs of the office as may be desired. One example of dictation equipment which has attempted to solve this problem is a dictation/transcription device marketed by the Dictaphone Corporation and identified as the DCX Dictamation machine.

Examples of various types of equipment known in the prior art for recording and playing back of information are illustrated in the following U.S. patents.

Sato (U.S. Pat. No. 4,119,813) discloses a cassette tape recorder and a radio which are detachably connected to each other. This arrangement permits the recorder to be connected to the radio when the recording of a radio program is desired, after which the two units can be disconnected for independent operation.

Freehauf (U.S. Pat. No. 4,130,849) discloses a set of recording devices which are individually selectable for recording specific classes of messages. This system permits specific types of data to be recorded on separate medium, thereby facilitating the collating of the stored data.

Kolodny et al (U.S. Pat. No. 4,260,854) discloses a dictation system having numerous tape recorders set forth in cabinet drawers adapted for use in a hospital situation wherein data from many patients is to be entered by physicians and other hospital personnel from many stations within the hospital. The system includes multiplexing equipment which is responsive to signals identifying individual ones of the patients for connecting specific ones of the tape recorders to the physicians and other hospital personnel for inputting of the requisite patient data.

Further U.S. patents of interest include U.S. Pat. Nos. 4,320,467, 4,380,052, 4,468,750 and 4,477,882. These patents describe systems composed of a plurality of computers joined in a network.

Also known in the art are various types of central dictation systems. Examples of these types of systems are described in U.S. Pat. Nos. 4,319,337, 4,041,249 and 3,984,644.

SUMMARY OF THE INVENTION

It is a primary objective of the present invention to avoid the disadvantages of the prior art, and provide a unique desktop type dictation/transcription apparatus having the ability to be formed by interconnecting individual modules (e.g., a record/playback module connected to one or more of a display module, a telephone interface module and another record/playback module)

to create different configurations of a desktop dictation system or a network of desktop dictation systems with a computer control.

It is therefore also a primary objective of the present invention to overcome the above described disadvantages and others in a desktop dictation/transcription system providing for the recording and retrieval of messages, particularly the recording and playback of voice signals. In accordance with this invention, the dictation/transcription system described herein is a desktop system constructed in modular form wherein individual component modules of the system can be added or removed from the system to attain an integral system configuration which provides the desired dictation/transcription features and functions.

It is also a primary objective of the present invention to provide a dictation/transcription system formed of one or more modules each having the capability of transmitting information to another module and receiving information from another module without there being any need for one module to have an identification of the other module to which it is sending information or from which it is receiving information. Thus, one module transmits and/or receives information independently of the one or more modules used therewith. A user can therefore easily interchange modules without the need of a technician or any kind of special adapter.

It is also a primary objective of the present invention to provide a dictation/transcription system having the ability for modular expandability for enhanced features, logical controls for efficient operation and dual cassette media configuration without the need for special adapters.

Preferably, modules are physically interconnected to form an integral structure. A common data link, such as a data bus, couples both command signals and control information signals among the respective modules, thereby enabling the modules to cooperate with each other in performing the various system functions. The system can include one or more recording/playback modules which may employ different sized storage media such as tape cassettes of the standard, mini, micro and other sized configuration. For example, when two recording/playback modules are interconnected, one module can be used for dictation/transcription while the other module can be used for telephone answering purposes. Other modules of the system can include a display module which may be connected to a recording/playback module for displaying information about the system, and also a telephone module which may be connected to a recording/playback module to permit a two-way flow of data between a storage medium in the recording/playback module and an external telephone system or private switchboard. These modules can be used together with or without a computer control.

A recording/playback module by itself can provide many standard dictation and transcription functions such as, for example, forward and reverse movement of a tape drive and review of previously recorded material. Also included can be editing functions such as the use of a second channel on a recording tape to store audio signals of an insertion with cue signals which identify the site of the insertion. The combination of a display module with the recording/playback module can present additional data showing the usage of the recording tape. Thus, the display module can present, by way of example, starting and end points of messages on the tape, the nature of the message such as a letter or memo, and space remaining for further dictation. The telephone module may be used by itself, as a standard telephone, and may also be used to provide numerous other features to the system. For example, the telephone module may be programmed by a user to answer telephone calls.

The desktop modular dictation system in accordance with the preferred features of the present invention can be comprised of a single module or various combinations of modules that are capable of being interconnected together for cooperating with each other to form various types of systems. For example, a single recording/playback module; two recording/playback modules; a recording/playback module with a display module; two recording/playback modules with a display module; a recording/playback module with a telephone module with or without a display module; a telephone module; two recording/playback modules with a telephone module with or without a display module. The telephone module with one or two record/playback modules and the telephone module with one or two record/playback modules with a display module can be used with a computer control network to form an entire computer controlled desktop dictation/transcription system.

A system (depending on the particular modules integrally connected together) has the capability of performing various functions. For example, when composed of two recording/playback modules, a telephone module and a display module, the resulting dictation system can perform the following functions which are employed generally in data transcription, particularly in the transcription of voice signals. These functions are: (1) the recording and playback of voice and other audio information; (2) the selection of locations in a recording medium; (3) the display of control information such as, for example, the location of data in the recording medium, the nature and the source of the data, starting and end points on a magnetic recording medium for a memo, letter or other message, and the time of the day; and (4) the interconnection of a telephone with the recording media to permit the recording of incoming messages and the playback of outgoing messages. In addition, the system configuration is readily adapted for the transfer of data from one recording medium to another, for example, as between two different sizes of cassettes of magnetic tape.

In accordance with the preferred features of the present invention, each of the modules includes a means for communicating information bi-directionally between one module and each of the other modules of the system such that one module transmits and/or receives information independently of the one or more other modules used therewith.

In accordance with other preferred features of the invention, each of the modules includes a microprocessor which is programmed to communicate with other modules of the system to determine whether such other modules are connected and operating. The modules may be disconnected selectively from each other to reconfigure the system as may be desired to provide only those features and functions which are desired and/or needed. The reconfiguration of the system is accomplished by having one recording/playback module, even if more than one module be present, to assume the tasks of polling and bus arbitration for communication among the modules. The polling is done initially at power-up and, thereafter, is repeated periodically at two-minute intervals by a recording/playback module. By virtue of the polling process, each of the microprocessors can assume control of communications relative to the respective module functions, and can pass control of the data bus to another module, dependent on the configuration of the system. While the recording/playback module and the telephone module may be operated each as a single stand-alone unit, the display module can operate only when connected to a recording/playback module.

In addition to a flow of command signals and control information along the common data bus, the system also provides for voice communication between a telephone module and one or more recording/playback modules. Two recording/playback modules can be employed in one embodiment of the invention.

In an office environment, there may be several dictation/transcription stations each of which is operated by a secretary who performs various functions such as the answering of a telephone and the transcription of dictated material. In accordance with the features of this invention each of these stations may include a recording/playback module, a display module and a telephone module. In a further embodiment of the invention, there is provided the additional feature of a digital communication network which links the foregoing stations with a supervisory station having a computer which monitors the utilization of telephonic and recording/playback equipment at the various stations. By means of the network, the invention makes available additional features such as the use of the computer to download a list of telephone numbers to telephones at the individual stations for the automatic dialing of frequently used numbers. Thus, the present invention advantageously provides: (1) a desktop dictation/transcription system of modular form which can be enlarged or reduced by attachment or detachment of modules integrally secured together; (2) a desktop dictation/transcription system wherein information is communicated bi-directionally between one module and each of the other modules of the system such that the one module transmits and/or receives information independently of the one or more modules used therewith; (3) a modular desktop dictation/transcription system having a master-slave function wherein, in the presence of a plurality of connected modules of the system, one of the modules automatically assumes command of the operation of the system; (4) a modular desktop dictation/transcription system wherein each of the modules in the system includes a microprocessor which is programmed to communicate with other modules of the system to determine whether such other modules are connected and operating; (5) a modular desktop dictation/transcription system having a microprocessor in each module for performing a polling function to determine the states of readiness of the other modules for communication of data among the modules, such polling permitting the addition or deletion of modules to the dictation system as required without alteration of the microprocessor program; and (6) a modular desktop dictation/transcription system that can be used together with a computer control network to form a computer controlled modular desktop dictation system.

BRIEF DESCRIPTION OF THE DRAWINGS

The foregoing aspects and other features of the invention are explained in the following description, taken in connection/with the accompanying drawing wherein:

FIG. 3 shows recording/playback module of FIG. 1 integrally connected to both a telephone module and to the display module of FIG. 2;

FIG. 4 shows a stylized view of a system configuration of the invention embodying a telephone module, two recording/playback modules and a display module in accordance with the invention;

DETAILED DESCRIPTION OF THE PREFERRED EMBODIMENTS

Figure 1:
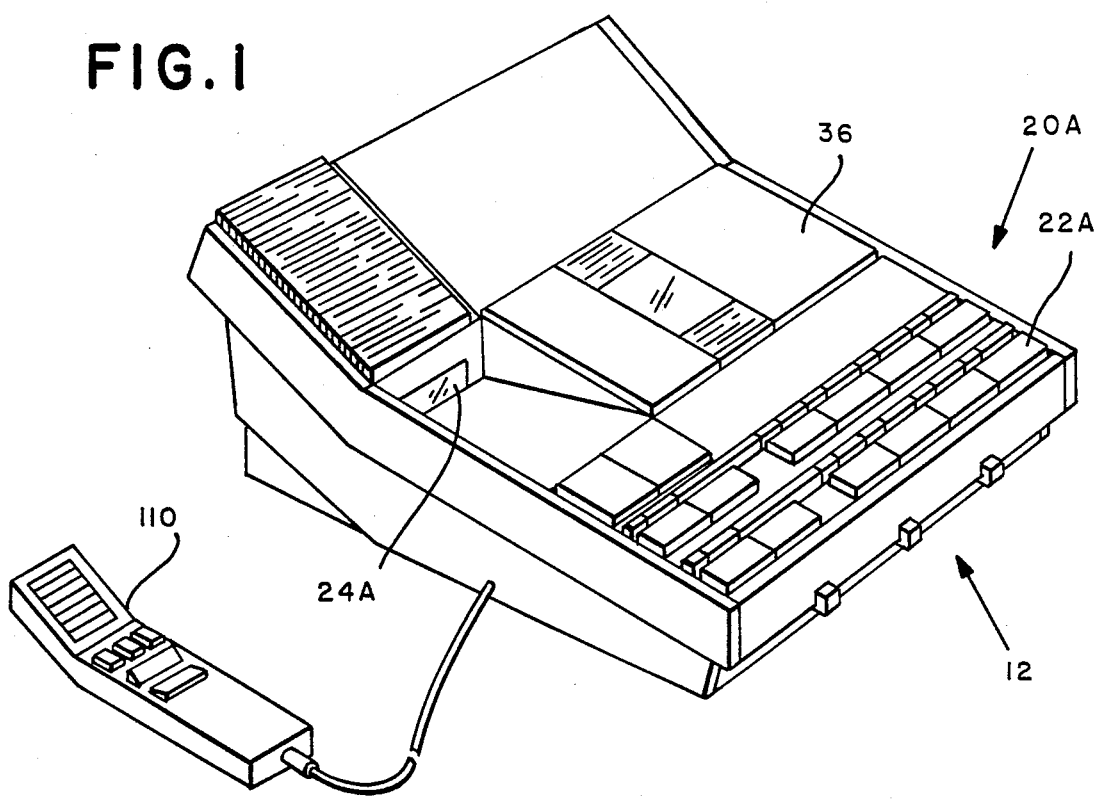
FIG. 1 shows a stylized view of a recording/playback device providing standard functions for the recording and playback of messages as a stand-alone unit and wherein, in accordance with the invention, the device is adapted by modular electrical and mechanical construction for interconnection to create an integral modular

With reference to FIG. 1, there is shown a recording/playback module 12 operable as a stand-alone unit for the recording and playback of messages, particularly voice. A microphone 110 is shown connected to the left side of the module 12 for use by personnel to record a spoken message on a recording medium such as magnetic tape within a cassette (not shown) located within a compartment 36 of the module. Push buttons 22A of a keyboard 20A are operably connected with a tape transport (not shown) for advancement and rewind of the tape. The module 12 includes a display 24A which presents various functions of the module, such as, for example, a recording function, the position of the tape, etc.

The recording/playback module 12 preferably has the following controls located in two rows on the top cover: ON, STOP, REWIND, FAST FORWARD, PLAY and ERASE in the bottom row; TELEPHONE, RESET, VOX, CONFERENCE, SPEAKER and INSERT in the top row. A mechanical EJECT control is preferably located adjacent to a cassette door on compartment 36. Pressing the EJECT control opens the cassette door for removal of a tape cassette. Alternate depressions of the ON control turn the machine ON and OFF. An ON LED is used in the record mode as a record modulation light. As long as the unit remains connected to a power source, the state of the SPEAKER control (e.g., whether an internal loudspeaker within module 12 or a speaker in microphone 110 is selected) as well as the display contents, VOX holdover time setting, and backspace setting are remembered in the OFF (Standby) mode. Module 12 automatically defaults to the Standby mode after approximately 15 minutes of no operation.

The TELEPHONE control button in conjunction with telephone recording accessories permits the recording of a two-way telephone conversation in one of several possible modes. Depression of the TELEPHONE button for more than 0.5 seconds (1) places the unit in Telephone mode; (2) increases the record gain to pick up weak telephone line signals; (3) turns on the internal speaker; (4) disables all other keyboard, footpedal or microphone functions; and (5) lights the Telephone indicator. In the Telephone mode, all user controls, including ON/STANDBY, are disabled. The unit must be taken out of Telephone mode to enable other controls to be used.

Depression of the CONFERENCE control button for more than 0.5 seconds lights a Conference indicator and places the unit in the continuous record mode if an optional conference microphone (not shown) is connected. No cue signals may be recorded in this mode. If warning tones are desired to indicate end zone and/or end of tape, the user depresses the speaker control button to enable them. If no optional conference microphone is present, the Conference indicator lights, and the record gain increases for hand microphone 110. Also, if the desktop machine was initially in the Record and the Conference control button is pressed, the machine continues in the Record mode with increased gain. If the desktop machine was not in the Record mode, then about a ½ second alert tone sounds and tape motion stops.

Depression of the Conference button a second time immediately terminates the Conference mode and returns the unit to the Stop mode. The Conference mode is also terminated by returning the microphone to its cradle (not shown), or turning module 12 off.

While the unit is on, in any mode, depression of the SPEAKER control alternately enables or disables the internal speaker. Preferably, a Speaker LED is lit whenever the internal speaker is enabled.

Depression of the STOP control button terminates any keyboard command that caused tape motion except Telephone Record and Conference Recording from the optional conference microphone. (The Telephone key stops tape in Telephone Record mode since Stop key is ignored. Likewise, the Conference key terminates conference recording with the optional conference record microphone.) STOP terminates record lock and auto play that had been initiated from the hand microphone 110.

Depression of the PLAY control button terminates any keyboard commands that caused tape motion except Telephone and Conference Record mode (with the optional conference record microphone) and places the unit in the Play mode and lights a Play LED.

The INSERT control allows a user to add more dictate material to the existing dictation without the need for editing. This is accomplished by recording the additional material on a parallel "insert" track beginning at the point where the new material should be included.

In another embodiment of the record/playback module 12 in accordance with the features of the present invention, the INSERT control is replaced with a FAST PLAY control. While in any PLAY mode, depression of the FAST PLAY control button lights a FAST PLAY LED, extinguishes the Play LED, and causes the tape to move at approximately twice normal play speed. Release of the FAST PLAY control button extinguishes the FAST PLAY LED, reilluminates the Play LED, and causes the unit to resume normal play speed.

A momentary depression of the RESET control button when module 12 is turned ON resets the tape counter to "0000". Holding the RESET control button (when the module 12 is turned ON) for approximately 0.5 seconds causes the display module 16 time line and digital displays to reset if module 12 is not in the Telephone mode.

Pressing the REWIND control button lights a rewind LED and causes the tape to rewind at approximately 10 to 25 times normal play speed until beginning of tape is reached or some other tape motion function is selected from the keyboard, hand microphone, or telephone module 18 handset.

If the unit is in Play (via a foot control—not shown) and the keyboard REWIND control button is tapped, the tape counter briefly shows the auto backspace setting (0.0, 0.5, 1.0, 1.5, 2.0, 2.5 or 3.0 seconds). Tapping the REWIND control button again increases the amount of auto backspace by 0.5 sec. The backspace setting wraps around from 3.0 sec. back to 0.0 sec. The default setting for auto backspace is zero (0.0).

Pressing the FAST FORWARD control button lights a fast forward LED and causes the tape to move fast forward at approximately 10 to 25 times normal play speed until (1) furthest advance is reached; (2) end of tape is reached; or (3) some other tape motion function is selected from the keyboard, hand microphone or telephone module 18.

If module 12 is in VOX Record mode, tapping the FAST FORWARD control button causes the tape counter to briefly show the VOX holdover time (i.e., the amount of time the tape continues in record after the voice has stopped) of 1, 2, 3 or 4 seconds. Tapping the FAST FORWARD control button again increases the amount of VOX holdover time by one second. The VOX holdover setting wraps around from 4 seconds back to 1 second.

The ERASE control button, when pressed simultaneously with the REWIND or FAST FORWARD controls, causes an erase LED and the appropriate Rewind or Fast Forward LED to light when the Erase function begins. The tape is erased while it is moving to either beginning of tape or end of tape depending on the mode selected.

Voice operated record (VOX) allows recording to start and stop automatically by the presence of or lack of audio signals respectively. It can be used in conjunction with any active record mode by pressing the VOX control. A VOX indicator is lit whenever the VOX mode is enabled and a VOX LCD indicator is lit when in active VOX record. Pressing the VOX control a second time cancels the VOX mode, leaving module 12 in the existing record mode.

An example of another feature of module 12 is called furthest advance. Furthest advance is a feature that causes the tape to stop at the last point of dictation on the primary track during any Fast Forward or Play mode. This frees the author from hunting for the furthest advance point after a review of previous dictation. Movement beyond furthest advance is possible by initiating any forward tape motion function while at furthest advance. Ejecting the cassette resets the point of furthest advance to the beginning of tape. With the display module 16 attached to module 12, furthest advance is preserved if display module 16 is placed in HOLD, for as long as display module 16 remains in HOLD.

Hand microphone 110 preferably contains the features and controls listed below. Any control activated on the microphone either cancels or interrupts any keyboard tape motion function except Telephone and Conference Record with the optional conference record microphone.

Depressing the RECORD control on microphone 110 places the unit in the Record mode; releasing the RECORD control places the unit in the Stop mode.

Pressing the RECORD LOCK control on microphone 110 places the unit in a continuous record mode. The RECORD LOCK function is terminated by any other hand microphone control except for CUE and FAST FORWARD. Also, the operations of the Rewind, Fast Forward, Erase and Insert buttons on module 12 are ignored in Record Lock.

Depressing the REWIND/PLAY control on microphone 110 causes the tape to rewind and provide audible feedback. During rewind, the machine pauses for about ½ second at all letter and instruction cues that may have been recorded. When the REWIND/PLAY control is released, the unit enters the Auto Play mode. If the Rewind control is held until the beginning of tape, a tone sounds and the unit enters the STOP mode when the Rewind control is released. The Auto Play mode is terminated by the operation of the Telephone, On, Conference Record, or Stop controls on module 12, or by the operation of the Stop, Record, or Record Lock controls on the microphone. The operation of the Fast Forward, Rewind or Cue controls will only interrupt the Auto Play mode while they are active.

The STOP control on microphone 110 stops all tape motion, except Telephone Record, Conference Record with the optional conference record microphone, and cue record.

Depressing the FAST FORWARD control button on microphone 110 causes the tape to Fast Forward with audible feedback, pausing at all letter and instruction tones and generating audible indications thereof. When the Fast Forward control is released, the recorder resumes Auto Play if it was in the Auto Play mode when the Fast Forward button was pressed; otherwise, the recorder enters the Stop mode. If the furthest advance point is reached while in Fast Forward, the recorder stops and generates a tone. To advance past furthest advance toward the end of tape, the Fast Forward control must be released and pressed again.

Pressing the left CUE control on microphone 110 once and releasing it within about 1 second records a letter cue tone on the tape. With display module 16 attached, a "letter" data block is recorded following the letter cue tone. Pressing this CUE control twice and releasing it within about 1 second with a display module 16 present, causes a "priority letter" data block to be recorded following the letter cue tone. Without he display module, this cue tone is indistinguishable from a normal letter cue tone. The CUE control interrupts any tape motion function initiated by the microphone or keyboard (except Telephone and Conference Record with optional conference record microphone) but does not terminate that function. This cue control normally is used at the end of a letter.

Pressing the right CUE control on microphone 110 once and releasing it within 1 second records an instruction cue tone on the tape. With display module 16 attached, an "instruction" data block is recorded following the instruction cue tone. Pressing this Instruction Cue control twice and releasing it within about one second with the display module present, causes a "note" data block to be recorded following the instruction cue tone. Without the display module, this cue tone is indistinguishable from a normal instruction cue tone. The CUE control interrupts any tape motion function initiated by the microphone or keyboard (except Telephone and Conference Record with optional conference record microphone) but does not terminate that function. This cue control normally is used before an instruction or note is dictated.

Figure 2:
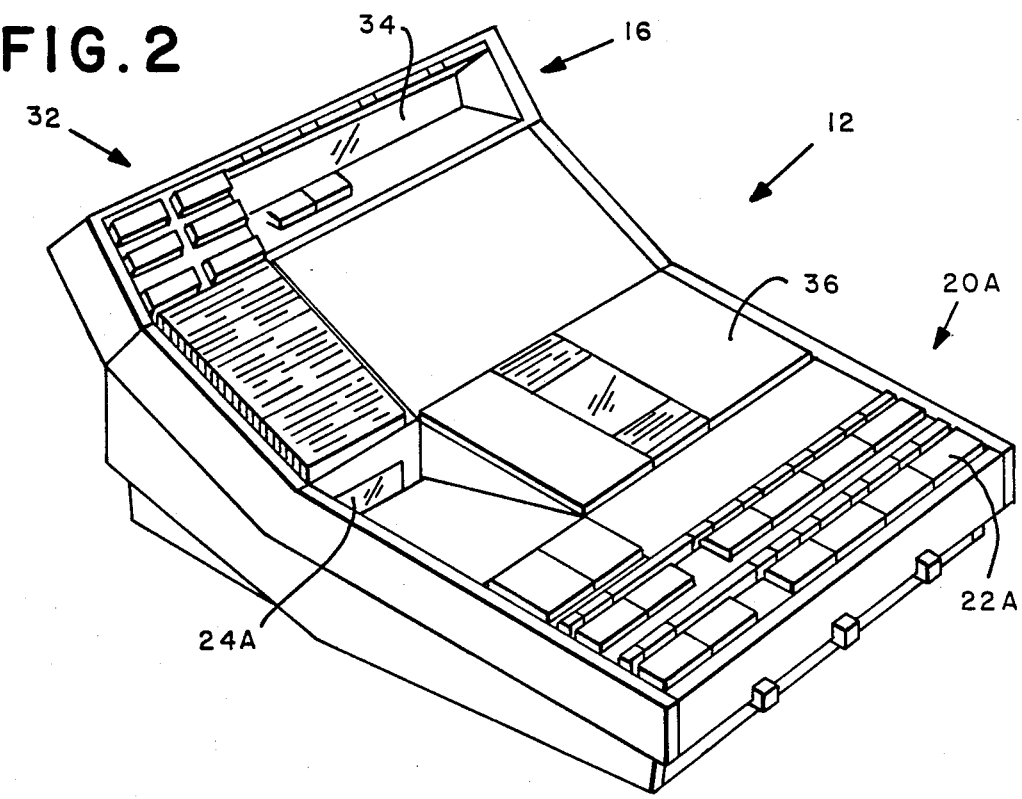
FIG. 2 shows the device of FIG. 1 with a display module integrally connected thereto for providing additional functions useful for dictation and transcription.

FIG. 2 shows a display module 16 which may be connected to the recording/playback module 12 to present additional information relating to the dictation and transcription functions of the system. For example, the display module 16 presents a succession of blocks comprising a series of segments on a lighted LCD display having lengths proportional to recorded messages such as letters, memos, and reports. The blocks appear on a display 34. Specific display functions are selected by a keyboard 32 of the module 16. A flashing block of segments may conveniently be used to indicate a priority item which is to be typed immediately by a secretary. Such display functions are in addition to that which is presented on the display 24A of the module 12. In accordance with a feature of the invention, electrical circuitry of the modules 12 and 16 is configured to allow the connection and disconnection of the modules 12 and 16 to provide or delete the additional functions as may be required.

Display module 16 provides a graphical and numeric display of information about a dictated cassette. Display module 16 always operates with one or two record/playback modules 12 (always connected to the left-hand module 12) with or without the telephone module 18. The record/playback module 12—display module 16 combination is capable of recording, playing back, and searching for digital information on the tape.

Display module 16 preferably has the following control buttons located near the display; CUE SELECT, FORWARD SEARCH, REWIND SEARCH, DISPLAY, FINISH and HOLD. The SEARCH and HOLD controls have LED indicators located adjacent to them that are illuminated only when the respective function is activated. Module 16 also preferably has the MODE and SELECT controls located in front of the LCD display 34.

Momentarily pressing and releasing the CUE SELECT control causes the display module to scroll to the next cue in a menu of available cue types. A transcriptionist can select either LETTER, PRIORITY LETTER, INSTRUCTION, NOTES, or all cues by using this control. The cue legends are preferably printed on a plastic insert that is placed on the surface of the LCD display 34. The CUE SELECT control electronically moves a display box on the LCD which surrounds each cue legend and makes that legend the object of a cue search. The selected type of cue will be the object of the SEARCH control.

A dual function button, when operated, records a Finish cue in the Dictate mode and removes or replaces dictation on the display in the Transcribe mode. Pressing the FINISH control in the Dictate mode causes a letter cue and a summary data block to be encoded on the tape at the point of furthest advance. The Finish Cue indictation illuminates until the Reset control is pressed or a new cassette is placed in the record/playback module 12. If after a Finish cue is recorded, further dictation is recorded without having pressed the Reset control, a second pressing of the Finish button will record a second Finish cue that contains all the information of the first Finish cue plus information relating to the new dictation.

The display module 16 is provided with status information when module 12 or telephone module 18 enters or leaves the Transcribe mode. Momentarily pressing and releasing the FINISH control in the Transcribe mode causes the message display segments whose boundaries encompass the time line cursor to be removed from the display (note that the time line cursor must be within the boundaries of this message display). Pressing and holding the FINISH key for more than ½ second causes all previously deleted jobs on the cassette to be redisplayed.

The FORWARD SEARCH control initiates a forward search for the cue type selected as described above. If a Finish cue has been previously read, or if a Display Scan operations has been accomplished without encountering a Finish cue, pressing the Forward Search control (in any mode except Telephone) causes the transport to enter the Fast Forward mode until, in the case of instruction/note cues, the actual selected cue is encountered, or in the case of letter/priority cues, the beginning of the letter associated with the cue is encountered. The machine will then enter the Play mode. If the tape position is currently within a job that is the object of the search (even at the beginning), the search will still go to the next selected cue type.

If a Display Scan operation has not been carried out, pressing the Forward Search control in any mode except Play and Telephone causes the transport to enter the Fast Forward mode and advance the tape to each cue encountered, at which point the machine enters the Play mode and the data block following the cue is read to determine the type of cue that has been reached. If it is not the selected cue, the transport will fast forward the tape to the next cue. If it is the selected cue, the machine will continue on in the Play mode. If the machine is in the Play mode, the search will skip the next cue (of any type) and then begin the search as outlined above.

The Rewind Search control initiates a Rewind Search operation for the cue type selected as described above. If a Finish cue has been previously read, or if a Display Scan has been accomplished without encountering a Finish cue, pressing the Rewind Search control in any mode except Play or Telephone, causes the transport to rewind until, in the case of instruction/note cues, the actual selected cue tone is encountered, or in the case of letter/priority cues, the beginning of the letter associated with the cue is encountered. The machine then enters the Play mode. If the machine is in the Play mode, the search skips the next cue (of any type) and begins the search as outlined above.

If a Display Scan operation has not been carried out, pressing the Rewind Search control in any mode except Play or Telephone, causes the transport to rewind to each cue encountered, at which point the machine enters the Play mode and the data block following the cue is read to determine the type of cue that has been reached. If it is not a selected cue, the transport rewinds to the next cue tone. If it is a selected cue, the machine continues on in the Play mode.

The Display control initiates a scan for a Finish cue. Momentarily pressing and releasing the Display control for less than ½ second causes the machine to rewind scan, read and display the finish cue tone and its accompanying summary data block. The machine then enters the Stop mode. The LCD display also shows the FINISH CUE legend for visual indication of a Finish cue detection. The legend and display will remain until Reset is pushed or a new cassette is inserted. If any cues are detected and displayed previous to detecting the Finish cue, the Finish cue has precedence and the previously detected cues are removed from the display. If the Finish cue tone is not encountered, the machine rewinds, reads and displays each cue encountered until a Finish cue or beginning of tape is encountered. If a Finish cue is not found or if the Stop control is pushed during a Scan, the "NO FINISH CUE" legend is shown in the display. The legend and the display remain until the Reset control is pushed for more than ½ second or a new cassette is inserted without the display module 16 being in its Hold mode. Pressing and holding the Display control for more than ½ second causes the machine to Fast Forward Scan for the finish cue tone.

Pressing the HOLD control allows the user to "freeze" the Time Line and Digital Display information from the selected module 12 unit. This allows removal of a cassette without losing the display information of that cassette. Another cassette, may then be transcribed or dictated. Pressing the Hold control again returns the display to its normal operation. Pressing the Reset control also releases the Hold mode in addition to resetting the display.

The Mode and Select controls are used to set or modify the time, day, month, date format, cassette length, and author I.D. on the digital display. Momentarily pressing the MODE control flashes the portion of the display that is to be set. The SELECT control may then be used to establish the desired value of the selected display. The desired value is entered when the MODE control is pressed to go on to the next display to be changed or if this mode is exited following a 15 second timeout. Subsequent depressions of the MODE control cycles through various displays (pressing and holding either the mode select or set controls for more than ½ second causes the functions to occur at an accelerated pace).

In any display module 16—telephone module 18 combination, the display module Mode and Select controls are disabled with regard to the Author I.D., Time and Date. Any telephone module preset Author I.D., Time and Date has precedence over any display module settings. However, the cassette type and Display mode still are settable by the display module using the Mode and Select controls. When a telephone module is attached, pressing the Mode control automatically jumps to the fields that can be set.

The display module 16 is capable of recording and reading a digital data block on the cassette in its companion record/playback module 12. The module 12 is capable of detecting the location of the data block at fast speeds and of reading the data block at play speed. Details of this feature are described in copending and commonly assigned U.S. patent application Ser. No. 894,993, Filed: Aug. 8, 1986, and Titled: DISPLAY FOR MODULAR DICTATION/TRANSCRIPTION SYSTEM.

The display module 16 includes a large LCD display consisting of three time lines, a numeric display, and several indicators. Additionally, it includes two LED's for direction information and four LED's for status type indicators. Details of these features are described in copending and commonly assigned U.S. patent application Ser. No. 895,011, Filed: Aug. 8, 1986, and Titled: DISPLAY FOR MODULAR DICTATION/TRANSCRIPTION SYSTEM.

The modularity concept of the invention is further demonstrated in FIG. 3 which shows the integral connection of a telephone module 18 to the recording/playback module 12. The telephone module 18 may be operated as a stand-alone unit for dialing another telephone to initiate a telephonic communication, and for receiving a telephonic communication. Personnel may speak and listen by means of a handset 26 connected to the module 18, and may enter dialing instructions by a keyboard 28. Conveniently, a called number appears on a display 30 of the module 18.

The telephone module 18 can function as a stand alone telephone, or interact in conjunction with a record/playback module 12 and/or display module 16, as well as be part of a dictation network.

The telephone module 18 as a stand alone unit can provide the following features: normal telephone operation, speakerphone operation with mute capability, directory dialing of 1 of 100 telephone numbers from an alphabetically sorted list, display of time and date, a call timer feature, a four function calculator, 21 keys providing single key selection of telephone number or other programmable features such as electronic lock, delayed ring and hookflash, touch tone and dial pulse dialing capability, automatic or manual redial with record of last five calls maintained, ring tone selection and a delayed ring feature, electronic lock inhibiting and restricting dialing, remote dictation (DICTEL) or remote transcription (TELSCRIBE) capability and author identification. The directory creating and searching features of the telephone module are specifically described in copending and commonly assigned U.S. patent application Ser. No. 895,001, Filed: Aug. 8, 1986 and Titled: METHOD AND APPARATUS FOR CREATING AND STORING TELEPHONE DIRECTORY LISTINGS.

A recording/playback module 12 may be connected to a telephone module 18. The telephone module becomes the interface for telephone recording, eliminating the need for optional telephone recording devices. The previous list of features for the telephone module is then expanded to include: local dictation onto or transcription off of the attached recording/playback module 12, having the features of the stand alone module 12 but using a telephone module handset or footpedal; telephone answering capability with the telephone module answering the call and module 12 then playing a prerecorded announce message followed by module 12 being automatically placed into the Record mode, allowing the caller to leave a message; Remote dictation capability similar to telephone answering operation, but the telephone module returns "talkdown tone" with the module 12/module 18 combination then in voice response mode of operation (VOX); telephone answering and remote dictation features including display number of calls, duration of each call, and time of call; selectable number of rings to answer in telephone answering or remote dictation modes of operation with toll saver feature; a feature called Auto Record that causes a module 12 to enter the Record mode as soon as a telephone line is seized; remote transcription capability, using a TELSCRIBE terminal, or another telephone module 18 allowing transcription to occur at the record/playback module 12/telephone module 18 combination from a remote location.

When a telephone module 18 is connected to dual record/playback modules the following features are added: a dual deck telephone answering machine with announcement messages on one deck and recorded incoming messages on the second deck, and with the ability to continue to record incoming messages on the announce deck if the message deck tape fills up; simultaneous telephone remote dictation or transcription on one module 12 with local dictation or transcription on the second module 12; and two single deck telephone answering machines in a multiple line environment if connected to a keyset expansion module.

When a telephone module 18 is added to a record/playback module 12—display module 16 desktop machine, the resultant machine has the features of the module 12—module 16 combination and the features of the Module 12/module 18 combination plus the following additional feature: automatic telephone directory transfer to or from the cassette.

When a second module 12 machine is added to the record/playback module 12—display module 16—telephone module 18 combination, the resultant machine has all of the features described above.

The telephone module includes the following controls located on its top cover: 12-KEY TELEPHONE KEYPAD, 21 USER PROGRAMMABLE KEYS, 9 DEDICATED FUNCTION KEYS, and 3 SOFT KEYS whose varying abbreviated definitions are generated on the LCD display of the telephone module.

The 12 key telephone keypad is used for simple telephone dialing and telephone directory searching. The 9 dedicated function keys provide functions such as intelligent telephone features, a 4-function calculator, and local dictation onto an attached recording/playback module 12.

The telephone module 18 preferably has a total of 21 user definable keys (two columns of eight keys each and five single keys preferably located at the lower front of the machine) that allow the machine's capabilities to match the user's requirements. Details of the unique features of these user programmable keys are described in detail in copending and commonly assigned U.S. patent application Ser. No. 895,017, Filed: Aug. 8, 1986 and Titled: PROGRAMMABLE TELEPHONE/DICTATION TERMINAL AND METHOD OF OPERATING SAME. A paper insert between the two columns of eight keys may be used to identify the function of each of the associated keys. Each of these 16 keys has an LED indicator which lights when that control is in use. The five programmable keys across the lower front edge also contain integral paper labels within the individual key caps, as well as adjacent LED indicators.

The five keys at the bottom front of the telephone module 18 can be used with an optional keyset expansion module in multiple telephone line environments. The user may reprogram these keys to any functions available to the top 16 programmable keys, if desired.

Any of the programmable key locations on the telephone module may be programmed for line selection if the keyset expansion module is present. The following is a partial list of typical uses for any of the 21 programmable keys:

Storage of Sprint or MCI numbers
Frequently called telephone numbers or extensions
Intercom
Line select for multi-line installations
Easy access to advanced features of the user's PB
Systems recorder access and control
Telephone answering set up.

At least sixteen of the dictation type desktop systems as described above can be combined with a computer (e.g., an IBM PC/XT or other "work alike" computer) and an interface (e.g., RS 422 or similar interface) to form in accordance with the features of this invention a network environment to provide the relatively small work group user with many PBX and central dictation features in a desktop apparatus.

The network features include (1) telephone/PBX features such as maintaining telephone directories, sending or receiving messages to or from a telephone module, providing telephone usage and accounting information and monitoring or controlling remote events (details of the networking of the system are described in copending and commonly assigned U.S. patent application Ser. No. 895,010, Filed: Aug. 8, 1986 and Titled COMMUNICATIONS NETWORK AND METHOD (2) dictation/transcription features such as monitoring dictation and transcription activities in the system, displaying dictation and transcription information on request or automatically and allowing remote dictation to be directed to the secretary's module 12/module 18 combination; (3) voice text mail features such as monitoring incoming and outgoing voice/text mail, displaying incoming and outgoing voice/text mail status, forwarding voice/text mail at preprogrammed times and annotating and redirecting voice/text mail (details of the voice/text mail features are described in copending and commonly assigned U.S. patent application Ser. No. 894,992, Filed: Aug. 8, 1986 and Titled: COMMUNICATIONS NETWORK AND METHOD WITH VISIBLE AND VOICE MESSAGE TRANSMISSION CAPABILITIES; (4) calendar and appointment features such as maintaining daily, weekly, and monthly appointment calendars, apprising the user of an appointment at preprogrammed times and maintaining a daily personnel log (details of the calendar and appointment features are described in copending and commonly assigned U.S. patent application Ser. No. 895,002, Filed: Aug. 8, 1986 and Titled: COMMUNICATIONS NETWORK AND METHOD WITH APPOINTMENT INFORMATION COMMUNICATION CAPABILITIES and (5) vertical market features such as monitoring stock quotations, listing dialing for customer survey, public opinion poll, etc., and receiving remote text messages.

In accordance with a feature of the invention, electrical circuitry of the modules 12, 16 and 18 is configured to allow the connection and disconnection of the modules 12 and 18 to provide or delete additional functions as may be required. In FIG. 3 the connection of the modules 12 and 18 can be accomplished whether or not the display module 16 is connected to the recording/playback module 12. Before connecting of the telephone module 18 to the left side of the recording/playback module 12, the microphone 110 is detached, and dictation is accomplished via the telephone handset 26. The combination of the two modules 12 and 18 provides additional functions such as the capability of recording a telephone conversation on the tape cassette of the module 12, and the provision of a recorded announcement which is to be transmitted from the recording/playback module 12 via the telephone module 18 in response to an incoming call. The foregoing modularity concept of the invention can be extended still further by connecting yet another recording/playback module to the assembly of FIG. 3 to create a dictation/transcription system having still further functions as will now be described with reference to FIG. 4. Electrical interconnection of the modules will be described with reference to FIG. 6, such electrical interconnection being adapted for implementing any of the assemblies of FIGS. 2–4.

With reference now to FIG. 4, there is shown a stylized view of a modular dictation/transcription system 10. The illustrated system 10 includes two recording/playback modules 12 and 14, the display module 16 and the telephone module 18; the modules are integrally secured together in modular form arrangement. The recording/playback module 14 has the same or similar construction to the foregoing module 12 and includes a keyboard 20B having a set of push buttons 22B for selecting, by way of example, record and playback functions. The module 14 also has a display 24B for monitoring the performance of a selected function. While the display module 16 is connected physically to the recording/playback module 12, electrical circuitry within the recording/playback modules 12 and 14 enables the display module 16 to monitor functions of either of the recording/playback modules 12 and 14.

As noted above, in accordance with a feature of the invention, the foregoing modules cooperate with each other by virtue of an electrical connection to be described hereinafter. The modules may be disconnected from each other, if desired, to permit independent operation of either of the recording/playback modules 12 and 14 and independent operation of the telephone module 18.

Interconnection of the modules is accomplished with a sharing of power lines and ground lines. Audio lines connect the telephone module with one or two recording/playback modules, and a communication link such as data bus interconnects the recording/playback module with the display module and/or another recording/playback module.

As will be described in detail, hereinafter, voice communication is accomplished by a set of four dedicated lines interconnecting the telephone module and each of the recording/playback modules. The four voice lines are coupled to the recording/playback modules by electronic switching circuitry operated by individual microprocessors of the respective recording/playback modules in response to command signals from the telephone module. By way of example in the use of such interconnection, one recording/playback module may be used to record an incoming telephone call while a second recording/playback module would be used to transmit an outgoing message as is done in an automatic telephone answering system.

For transmission of the command signals and the control information along the common data bus, the microprocessor in one of the modules assumes control, in accordance with a predetermined polling protocol, to arbitrate the use of the bus among the respective modules.

The various modules are connected and disconnected physically with the aid of removable side panels and a multiple-conductor ribbon cable. This arrangement provides a readily assembled unitary construction for a complete system as well as for portions of a complete system. The recording/playback and the telephone modules are constructed with similar transverse cross-sectional form to permit an integral union of these modules in a modular side-by-side array. For best results, the display module is taller and narrower than a recording/playback module to permit a mounting of the display module on the back side of a recording/playback module so that the display of the display module is in view of personnel operating the recording/playback module.

Each of the recording/playback modules 12 and 14 may be of identical construction, or may differ with respect to the size of the cassette compartments 36 and 38, respectively, in the module 12 and 14. Different size compartments permit the use of different size storage media for dictation. The compartment 36 is shown smaller than the compartment 38 in which case, by way of example, the compartment 36 may contain a microcassette and the compartment 38 may contain a recording cassette of standard size. This presents a choice of medium upon which a telephone message can be recorded or upon which, by means of either the telephone or the microphone, dictation can be recorded.

The display module 16 acts in concert with both the recording/playback module 12 and the recording/playback module 14 to display control information relative to dictation for either one of the modules 12 and 14. By way of further example, such information may include markers showing starting and end points of a dictated message, the nature of the message, the identity of the person preparing the message, and other such information as would be useful to a typist preparing a document containing the information as well as to a supervisor of personnel in an office utilizing the dictation/transcription system 10. Details of a display module 16 acting as the display for two recording/playback modules are described in copending and commonly assigned U.S. patent application Ser. No. 894,583, Filed: Aug. 8, 1986 and Titled: DISPLAY FOR MODULAR DICTATION/TRANSCRIPTION SYSTEM.

In a preferred embodiment of the invention, some of this control information is presented on the display 24A or 24B of the recording/playback module 12 or 14, with the balance of the information being presented on the display 34 of the module 16 for efficient utilization of the components of the system 10.

If relatively little information is required, the modules 12 and 14 may be employed without use of the display module 16 and, when more complete information is required, the display module 16 is connected to the back of the module 12. While the display module 16 stores control information from both of the modules 12 and 14, as will be described subsequently, the display 34 preferably shows only the information relating to the one recording/playback module 12 or 14 currently being used for the reception of voice signals from either the microphone or the telephone.

Figure 5:
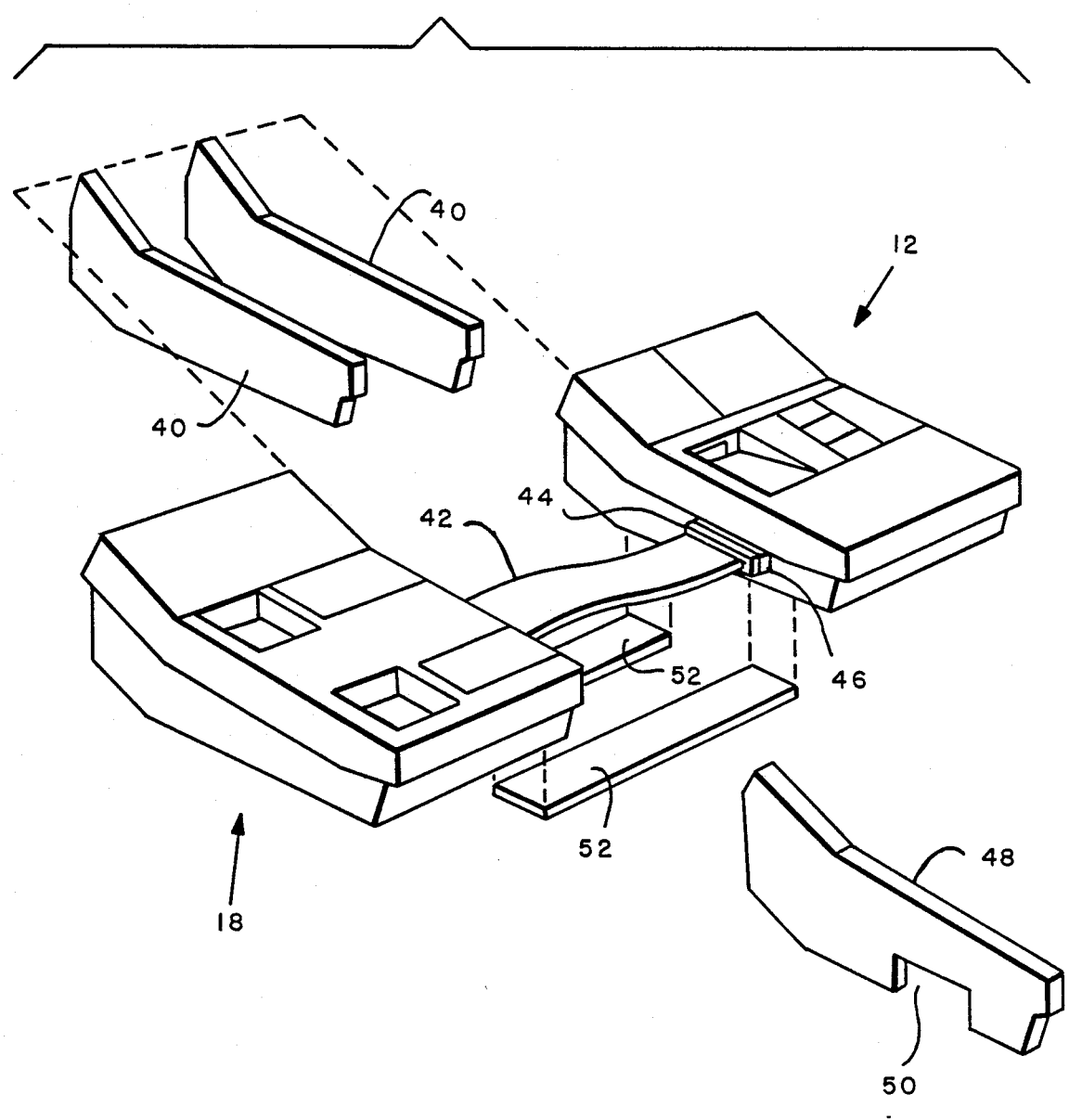
FIG. 5 shows an exploded view of the connection between the telephone module and a recording/playback module of FIG. 4 to demonstrate the use of a removable side panel.

FIG. 5 shows an exploded view of the junction between a recording/playback module 12 and a telephone module 18, the presentation in FIG. 5 being simplified so as to show only those details necessary for understanding the operation of the invention. The presentation of FIG. 5 applies also to the junction between the two recording/playback modules 12 and 14.

Prior to assembly of the system 10, as depicted in FIG. 4, the recording/playback module 12 and the telephone module 18 are each provided with sidewalls 40 which allow the modules 12 and 18 to be operated individually as stand-alone modules. In order to join the modules 12 and 18 together, the sidewalls 40, at the site of the union are removed from the modules 12 and 18, and a multi-conductor ribbon electric cable 42 is connected between the two modules 12 and 18. The cable 42 is provided with multiple pin plugs 44 which are inserted into mating sockets 46, one such plug 44 and such socket 46 being shown in FIG. 2.

A partition 48 having a slot 50 therein for clearance of the cable 42 is inserted between the modules 12 and 18, after which the modules 12 and 18 are brought together. Thereafter, a pair of braces 52 can be attached to the bottoms of the modules 12 and 18 to insure extra rigidity in the physical connection of the module 12 to the module 18.

The sidewalls 40 and the braces 52 may be connected by conventional devices such as screws which are inserted into an underlying frame (not shown) in each of the modules 12 and 18. The location of each of the sockets 46 is recessed within each of the modules 12 and 18 so as to provide clearance for the sidewalls 40, and also to provide space for the cable 42 as it is gathered together upon emplacement of the modules 12 and 18 in side-by-side relation.

Figure 6:
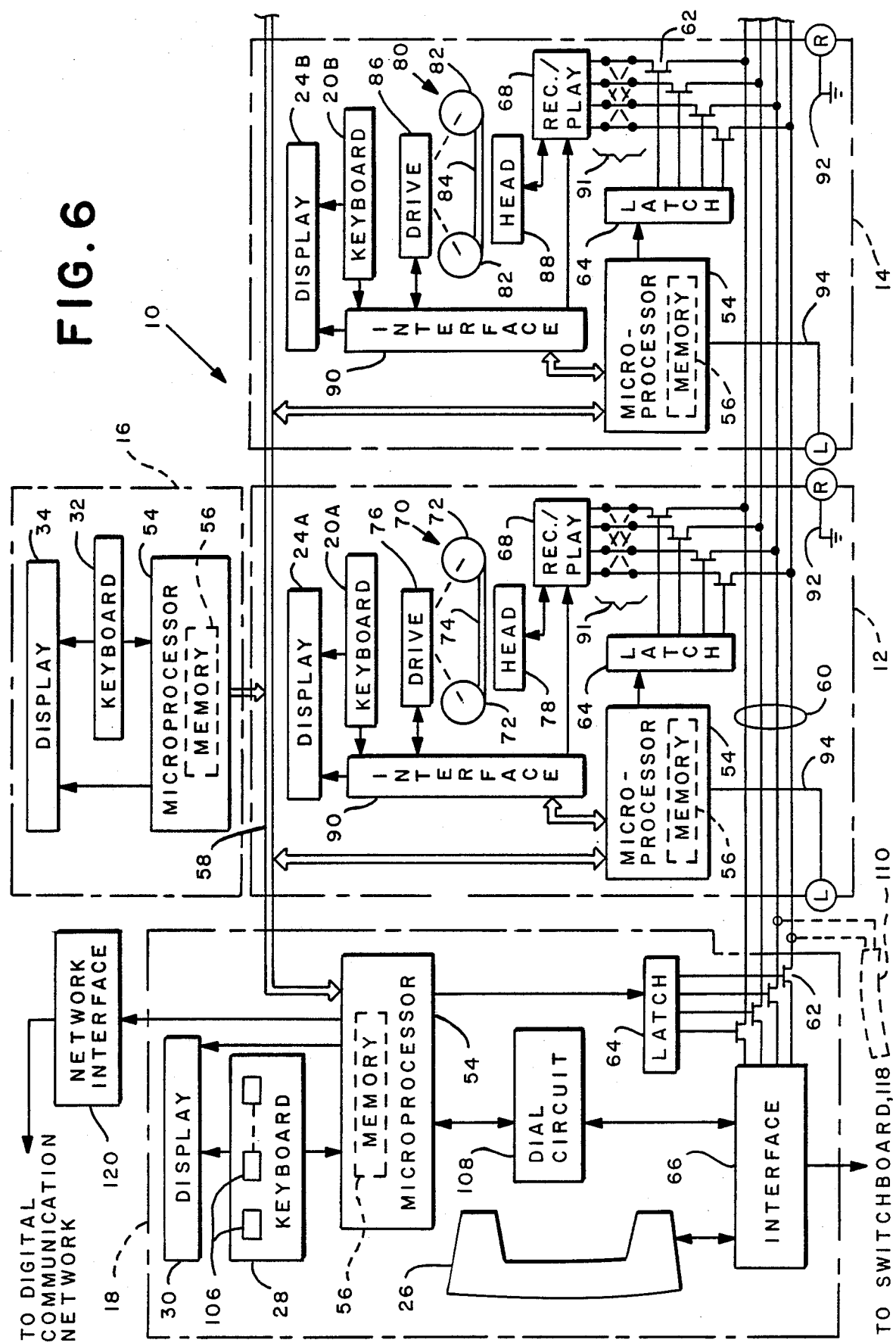
FIG. 6 is an electrical block diagram of the system of FIG. 4.

With reference to FIG. 6, there is shown a diagram of electrical components within each of the modules 12, 14, 16, and 18 as well as electrical interconnections between the components of respective ones of the modules. Each of the modules includes a microprocessor 54 which operates with a memory 56, the memory 56 being capable of storing a program and such data as is required in the operation of the microprocessor 54.

In accordance with a feature of the invention, a communication link, such as a common data/address bus 58, interconnects each of the microprocessors 54. The bus 58 is composed of wiring within each of the modules with portions of the bus 58 being formed by conductors of the cable 42 for completion of the bus connection between the respective microprocessors 54. Also included within the recording/playback modules 12 and 14, as well as within the telephone module 18, is a set of four voice lines 60, portions of the lines 60 being formed by wires of the cable 42 to provide for interconnection of the voice lines within the modules 12, 14 and 18.

Access to each of the lines 60 is provided by analog FET (Field Effect Transistor) switches 62 which are operated by digital signals applied to their respective gate terminals by latch circuits 64. The latch circuits 64, in turn, are driven by output signals of respective ones of the microprocessors 54 in the modules 12, 14, and 18. An interface unit 66, of well-known construction, connects the telephone handset 26 to the set of voice lines 60, thereby providing voice communication from the telephone handset 26 to record/playback circuitry 68 in each of the recording/playback modules 12 and 14.

The recording/playback module 12 is configured for holding a cassette 70 including reels 72 which carry a tape 74 of magnetic storage material and are rotated by a drive 76 for carrying the tape 74 past a record/playback head assembly 78. The head assembly 78 connects electrically with the circuitry 68 for coupling electrical voice signals of the telephone handset 26 to the head assembly 78, the latter converting the signal to a form suitable for recording such as, magnetic flux for storage of the voice signals on the tape 74. Digital storage in a random-access memory may also be advantageous should such storage media become desirable in voice recording. During playback, the magnetically stored signals are converted at the head assembly 78, in a well-known fashion, to electrical signals which are amplified by the circuitry 68 to be applied to the module 14, or via the interface unit 66 to the telephone handset 26. The recording/playback module 14 operates in the same fashion as does the recording/playback module 12, and includes a cassette 80 with reels 82 for carrying a tape 84, under control of a drive 86, to a head assembly 88. As noted above, the cassettes 70 and 80 and their associated equipment may be of the same size, or may be of differing sizes as shown in FIG. 4, for handling different sizes of the magnetic storage media.

In each of the recording/playback modules 12 and 14, an interface unit 90 connects the display 24A or 24B, respectively, and the keyboard 20A or 20B, respectively, to the microprocessor 54. These connections are presented by way of example in accomplishing desired dictation/transcription functions, it being understood that other component configurations may be provided within the spirit of the invention.

Electric signals for operation of the drive 76 and the drive 86 are also provided by the microprocessors 54 and their interface units 90 in respective ones of the modules 12 and 14. A further connection between the interface unit 90 and the record/playback circuit 68 selects recording or playback functions. Thereby, the microprocessor 54 in the module 12, and the microprocessor 54 in the module 14 control operations of the components in respective ones of the modules 12 and 14. Similarly, the microprocessor 54 in the display module 16 controls the presentation of information on the display 34, and the microprocessor 54 in the telephone module 18 directs operation of components of the module 18.

Figure 6A:
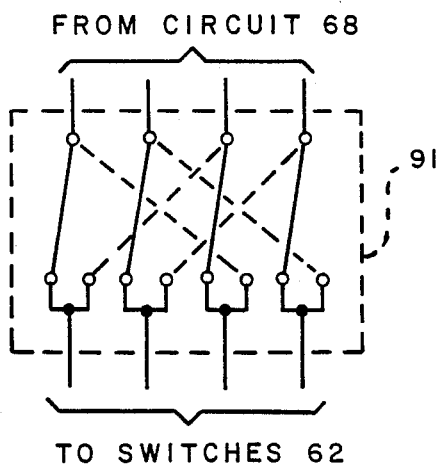
FIG. 6A shows an optional switch for use in a recording/playback module of FIG. 6.

In the connection of the recording-playback circuitry 68 to the four lines 60 for communication of audio signals, as described above, the switches 62 connect the recording portion of the circuit 68 in each of the modules 12 and 14 to one pair of the lines 60, and the playback portion of the circuit 68 in each of the modules 12 and 14 to the second pair of the lines 60. Such connection is advantageous, for example, for communication with the telephone module 18. However, should it be desirable to transfer audio signals directly between the recording tapes 74 and 84 of the modules 12 and 14, respectively, such as for rerecording material from a microcassette to a standard-size cassette, then an additional set of switches 91 (shown in phantom-view in FIG. 6) is to be included in each of the modules 12 and 14. The connections of the set of switches 91, a preferred construction being shown in FIG. 6A, provides for cross switching between the recording portion of the circuitry 68 and the playback pair of lines 60. Similarly, the playback portion of the circuitry 68 can be cross-switched to the recording pair of line 60 by the set of switches 91. In FIG. 6A, the cross-switched portions of the switches are shown with dashed lines while the normal positions are shown with solid lines. In each of the modules 12 and 14, the set of switches 91 is activated by the latch circuit 64 under control of signals from the microprocessor 54. Such control is similar to that described above for the switches 62. The switches 91 may also be formed of FET's as are the switches 62. Operation of the set of switches 91 in one (but not both) of the modules 12 and 14 provides the desired connection via the lines 60 to enable the transfer of recorded material such as letters, reports, and other documents between the recording tapes 74 and 84.

Figure 7:
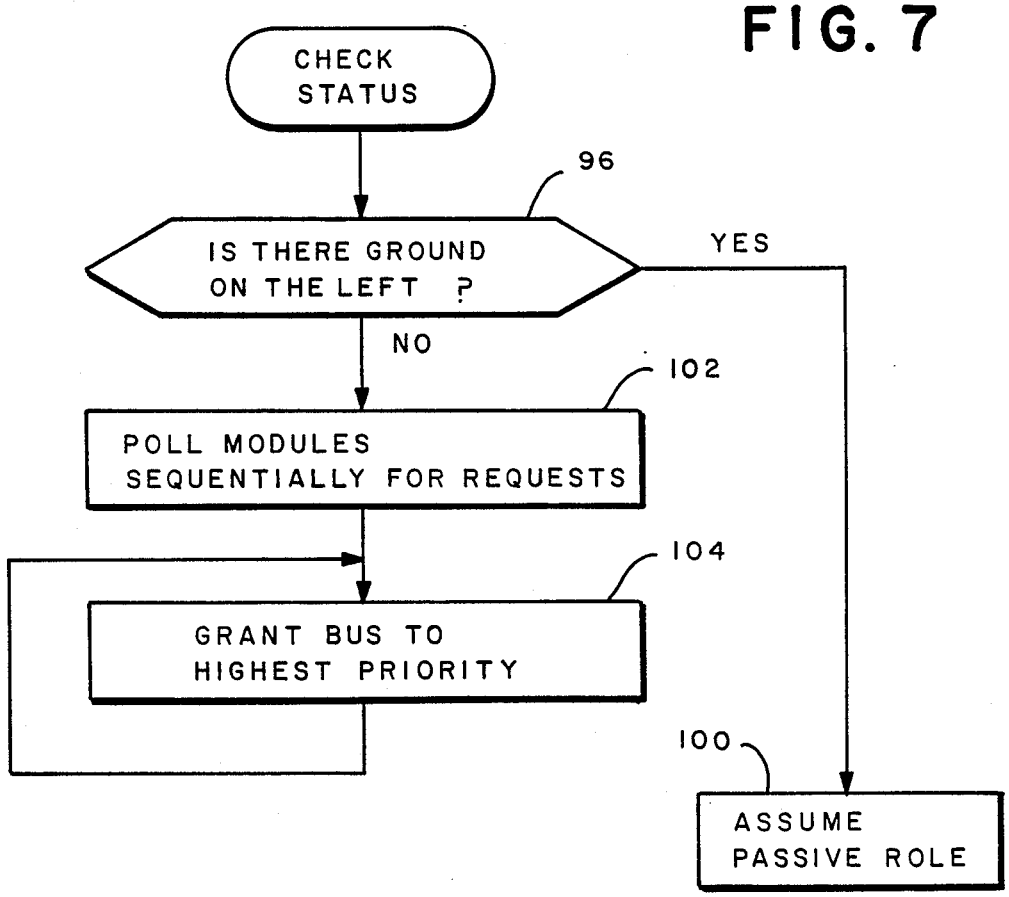
FIG. 7 is a flow chart describing a program for a microprocessor in a recording/playback module of FIG. 4.

With reference also to FIG. 7, the operation of the microprocessor 54 in either of the recording/playback modules 12 and 14 can be better understood. Considering the module 12 by way of example, the microprocessor 54 operates whether the module 12 is employed in a stand-alone configuration, or in a configuration wherein the module 12 is joined to either one of the modules 14, 16 or 18 or operated in the configuration of the system 10. Accordingly, a major function of the microprocessor 54 is to determine the nature of the configuration, thereby to conform the operation of the module 12 to the specific one of the foregoing situations.

The microprocessor 54 is programmed, as set forth in the flow chart of FIG. 7, to begin with a check of the status of the configuration of the other modules to which the recording/playback module 12 may be connected. The status check is accomplished with the aid of leads 92 and 94 which connect from right (R) and left (L) terminals at the right and left sides of the module 12. Line 92 grounds the right terminal, and line 94 connects the left terminal with the microprocessor 54. The corresponding set of leads and terminals is present also in the recording/playback module 14.

In block 96 of the flow chart in FIG. 7, the microprocessor 54 attempts to receive a ground signal from the recording/playback module on the left side. When two of the recording/playback modules, such as the modules 12 and 14, are connected together, the terminals R and L are connected together. Therefore, the presence of ground on line 94 indicates that there is a recording/playback module located on the left side of the module carrying out the program of FIG. 7.

As a matter of convention in the operation of the system 10, the recording/playback module on the left, this being the module 12, takes charge of arbitration of the digital signals flowing on the bus 58 among the modules 12, 14, 16 and 18. This is accomplished by interrogation or polling of the microprocessors of respective ones of the modules. The bus 58 includes sets of bus-request and bus-grant lines for respective ones of the microprocessors. A bus request is made by a microprocessor of the modules 14, 16 or 18 in response to the interrogation or when there is a need to transmit data. The data transmission begins with the granting of the bus by the microprocessor of the module 12, and terminates with the relinquishing of the grant upon completion of the data transmission. The status check of the program thus determines if microprocessor 54 in module 12 is to be in charge of bus arbitration (e.g., if ground is not detected on line 94).

With respect to block 96 of the flow chart, in the event that a ground signal is received from the module on the left, then there is a module 12 located to the left of the module 14. In such situation, the flow chart indicates, at block 100, that the microprocessor 54 of the module 14 is assuming a passive role with respect to control of functions serving other ones of the modules. Under these circumstances, the module 12 would receive no signal at its left terminal L and, accordingly, the program passes to block 102.

Upon reaching block 102 of the flow chart, the microprocessor 54 of the sole recording/playback module (if only one recording/playback be present), or of the left recording/playback module (if two recording/playback modules be present), provides signals for initiating communication via the common data/address bus 58. The arbitration of digital signals on the bus 58 may assume any suitable well-known subroutine of bus arbitration.

If the dictation/transcription system 10 is reduced to the single recording/playback module of FIG. 1 operating in a stand-alone mode, the interrogation is repeated every two minutes to determine if another module has been connected or activated. In the event that the display module 16 is employed with the two recording/playback modules 12 and 14, the foregoing bus arbitration permits the loading of signals from each of the modules 12 and 14 into the memory 56 of the microprocessor of the display module 16.

Assuming that all four modules are present, as shown in FIGS. 4 and 6, the communication of information among the respective modules proceeds in response to the generation, by a microprocessor in one of the modules, of a request to transmit via the data/address bus 58. As shown in block 104, the microprocessor of the left module 12 grants the bus request, whereupon communication of information via the bus commences. By way of example, upon a granting of the request, information in the form of a command signal may be transmitted via the bus 58 from the telephone module 18 designating a telephone answering mode of operation in which the recording/playback module 12 functions as a recorder of an incoming message while the recording/playback module 14 functions to play back a prerecorded outgoing announcement message which is to be transmitted via a telephone switchboard 118 to another telephone. In accordance with such command from the telephone module 18, the microprocessor of the module 12 directs its latch circuit 64 to operate a pair of the switches 62 for coupling a pair of the lines 60 to the circuitry 68 for receipt of an incoming message from the switchboard 118. In the event that plural bus requests are received simultaneously, the requests are filled in the order of a predetermined priority such as, telephone module followed by a recording-playback module, followed by a display module (the latter exhibiting the lowest priority).

As a further example in the operation, the microprocessor of the module 18 also directs, via the bus 58, the microprocessor of the module 14 to command its latch circuit 64 to operate the other pair of switches 62 for connecting the remaining pair of lines 60 to the circuitry 68 of the module 14 for transmission of an announcement message via the lines 60 to the telephone handset 26. This is possible for announce message verification; however it is the microprocessor in module 18 that directs module 14 to play back the message.

In the case of the foregoing example with the use of the telephone module 18, the microprocessor of the left module 12 may receive from the microprocessor of module 18 control information, such as, for example, initiation and termination of a telephone conversation. Representations of the beginning and the end of a telephone message are recorded, for example, as cue signals on the tape 74 in the module 12. In addition, the corresponding locations of the cue signals on the tape 74 are transmitted by the microprocessor 54 to the display 24A and/or to the display 34 as may be desired. It should be noted that information is transmitted to display 34 of module 16 from module 12 by providing a bus request and a bus grant, which establishes a communication path between the microprocessors of modules 12 and 16, followed by suitable display data that is received by the microprocessor of module 16. This data then is displayed by display 34.

Thereby, the microprocessor of the recording/playback module 12 has implemented the desired commands for operation of the modules and for display of the desired control information on the display module 16. Thereafter, the program reverts to the checking for further bus requests to ascertain whether information is to be transmitted via the bus. In the event that the electric power would be turned off, and then reapplied, then the operation of the module 12 would revert to status check at the top of the flow chart of FIG. 7.

A corresponding programming mode is employed for the microprocessors of the display module 16 and the telephone module 18. By way of example in the operation of the telephone module 18, the keyboard 28 is provided with keys 106, some of which are known as hard keys wherein the functions are fixed, and some of which are known as soft keys wherein the functions of the keys can be altered by personnel operating the telephone module 18. This is accomplished by use of the display 30 to determine what functions are available and what keys or combination of keys are to be employed in attaining a desired function.

Such functions would include the automatic dialing of a distant telephone to initiate communication therewith, the dialing being accomplished by the microprocessor 54 with the aid of a dial circuit 108 connecting via the interface unit 66 to the set of lines 118. Automatic dialing circuits are well-known and commercially available, and, accordingly, the use of a microprocessor with an automatic dial circuit is readily accomplished.

Alternatively, the keys 106 might be utilized to set up the foregoing answering-machine mode of operation in which one of the recording/playback modules serves as the recorder of the conversation at the telephone handset 26, while the other recording/playback module provides an outgoing announcement message. For such purpose, the microprocessor 54 of the telephone module 18 directs its latch circuit 64 to command the switches 62 to close the circuit in the line 60 connection of the interface unit 66 with the modules 12 and 14. The keys 106 also select and control information to be presented on the display 30, which information may include the length of time during which a conversation is continuing, as well as the number of the called party.

As had been noted above, the telephone handset 26 may also be utilized in lieu of a microphone 110 for recording any message directly onto the tape 74 or 84. The telephone handset 26 includes control buttons (not shown) for implementing standard record/playback commands to a tape drive such as the drive 76. The connection of microphone 110 to a line 60 is shown in phantom because the microphone 110 is only connected when the telephone module 18 is disconnected from the recording/playback 12.

In the operation of the various microprocessors 54, it is noted that each of the microprocessors has its own clock (not shown) for timing the operation in each of the microprocessors. The transmission of information along the common bus 58 is accomplished preferably asynchronously, thereby permitting the microprocessors in multiple modules to communicate with the bus 58. Alternatively, the transmission of information along the common bus 58 may be accomplished in synchronized fashion by means of a master-slave clock arrangement, not shown. In view of the assumption of control of bus arbitration by only one of the microprocessors (e.g., the microprocessor of module 12 in the illustrated configuration of modules), such asynchronous transmissions can be handled expeditiously without any conflict appearing among the transmissions of the respective modules. The individual transmissions can take place at slightly differing clock rates provided by the clocks in respective ones in the microprocessors.

The communication of information, such as function commands, between any two of the modules illustrated in FIG. 7, as described, is by way of common bus 58. In general, data is transmitted from a sending module to a receiving module by adoption of the following protocol: A bus request is provided by the sending module and if this is the only module to make that request, or if this module exhibits the highest priority, the request is granted. The sending module then identifies the particular module to which data is to be transmitted, whereupon the identified module returns an acknowledgement. Information then is transmitted from the sending module to the identified receiving module. This information may include, for example, function commands (e.g., to command a recording or playback operation or a particular display operation or other operation as described herein), display data or other information used in recording or playing back, or in displaying information, or in operating a telephone. The microprocessor provided in the receiving module utilizes such information to initiate and control a corresponding operation of that module. In some instances, for example, when function commands are transmitted to the microprocessor of module 12 from module 18, module 12 responds thereto in the same manner as if the function commands had been produced by the operation of keyboard 20A. Thus, information is transmitted from one module to another in the same way, without regard to the type of module that is transmitting or receiving that information. While the particular data which constitutes the information is determinative of the function performed or indication displayed by the receiving module, the manner in which that information is transmitted and received is the same for all modules. Hence, a module transmits and/or receives that information independently of the type and function of the module with which it is communicating. Communication is carried out the same way for all modules.

In view of the foregoing description, there is provided a modular dictation/transcription system, in which the components can be electrically and mechanically connected and disconnected as may be required to provide a desired set of recording/playback functions. Modules may be used individually when only a relatively few functions are required. Alternatively, when additional functions are required, the modules are connected together in a system wherein the individual modules interact with each other to provide additional recording/playback functions. Each of the recording-playback modules 12 and 14, and the telephone module 18 are self-contained in the sense that each contains its own microprocessor and its own clock so as to be able to function independently of other modules when such independent operation is required.

In the foregoing system, interaction has been provided between each of the recording/playback modules, the display module and the telephone module. The four modules taken together may be regarded as a single dictation/transcription station. The concept of the invention can be extended to provide for interaction among a plurality of such dictation/transcription stations. This is accomplished by providing an additional common data/address bus connecting the memories of the microprocessors in each of the telephone modules of the respective dictation/transcription stations as will be described in FIG. 8. At a supervisory station, a computer accesses each of the dictation/transcription stations via the additional digital network to display and/or store the data from the individual stations. In this way, a supervisor can monitor the operation of several dictation/transcription stations so as to obtain information on the usage of telephone lines, and the amount of dictation provided by individual users of the dictation equipment.

Interaction among the stations and with remote sites can be extended further by providing an additional voice circuit which connects between the telephone modules of the dictation/transcription stations and a private telephone switchboard. Telephone communication can be accomplished between different ones of the dictation stations so as to permit still further flexibility in configuring the overall system for storage of voice information on recording media at various ones of the dictation stations. With the enlarged system concept involving the interaction among plural dictation/transcription stations, the recording of incoming telephone messages and the transmission of outgoing telephone messages can be accomplished between sites within the system, as well as between a site within the system and a location outside the system, including a long distance location such as a foreign country.

Figure 8:
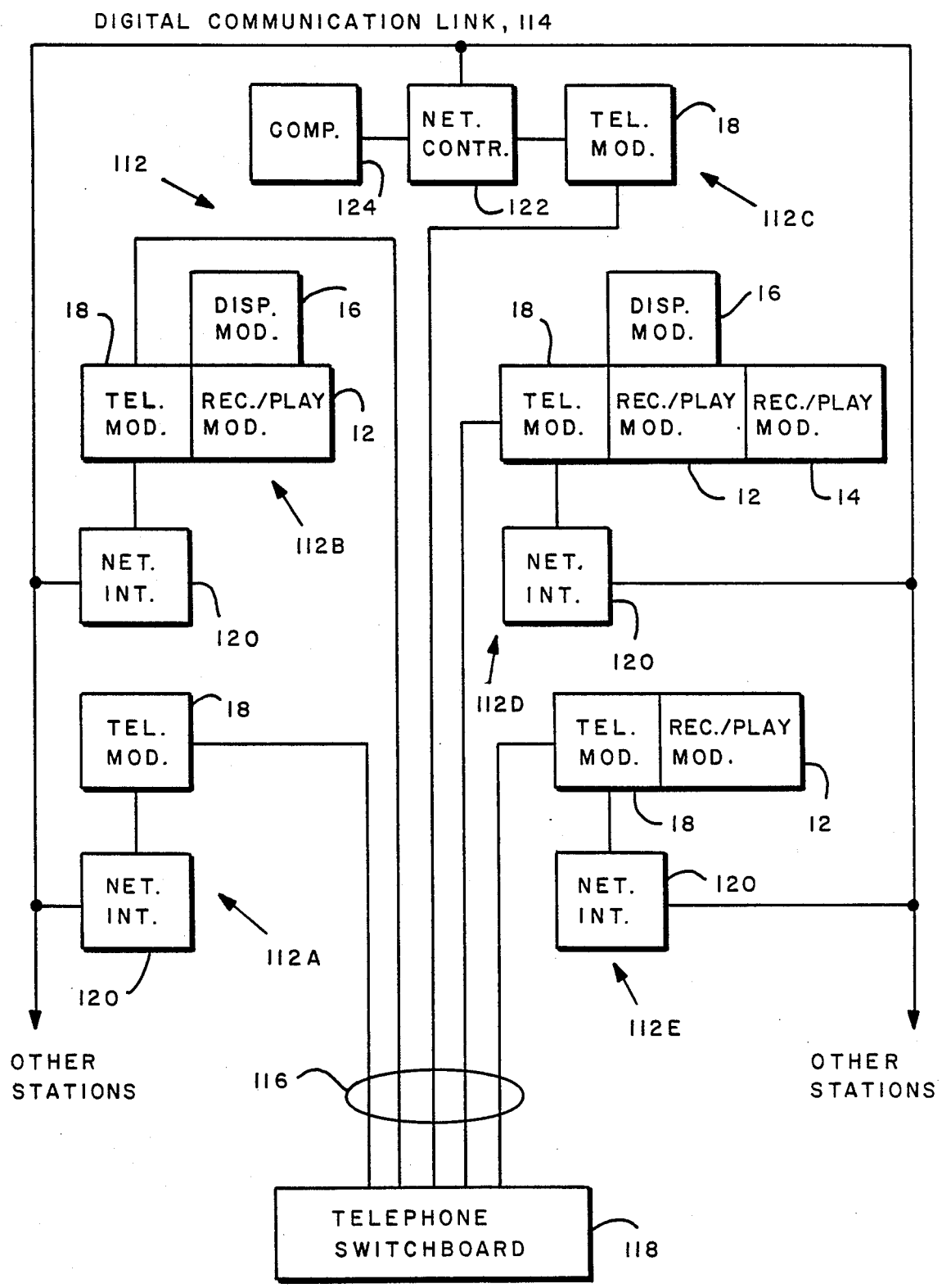
FIG. 8 is a block diagram of a system of stations, each of which includes a telephone module and may also include a recording/playback module and display module of FIGS. 1–4, the stations being interconnected by a digital communication, network.

FIG. 8 shows a further embodiment of the invention in which a plurality of dictation/transcription stations 112 are connected by a digital communication link 114, and by a set of telephone or voice lines 116 which connect with a telephone switchboard 118. Individual ones of the stations 112 may be further identified by legends A-B when it is desired to identify specific ones of these stations. Each of the stations 112 includes the telephone module 18 and an interface network 120 of FIG. 6, and may also include other components of the dictation/transcription system 10 of FIG. 6.

The station 112D includes the same configuration of components as is shown in FIG. 6, these components being the two recording/playback modules 12 and 14, the display module 16, the telephone module 18, and the network interface 120. The station 112C is a supervisory station comprising the telephone module 18 as well as a network controller 122 and a computer 124. The station 112B contains one less recording/playback module than does the station 112D. The station 112E is the same as the station 112B except that the display module 16 is not present. The station 112A comprises only the telephone module 18 and the network interface 120. Thus, the arrangement of FIG. 8 shows various possible combinations of the components of the modular dictation/transcription system 10 which may be employed in a dictation/transcription station.

The communication link 114 preferably comprises a twisted pair of electric wires for half-duplex communication in a protocol of the bisync format. Thus, communication can take place in both directions, but only in one direction at a time. The network interface 120, by way of example, in a preferred embodiment, is digitally operated and outputs signals in accordance with the EIA specification RS485. The microprocessor 54 (FIG. 6) has an input/output port for communication with the interface 120 so as to enable transfer of data from the memory 56 of the microprocessor 54 in unit 18 to a memory of the computer 124 at the supervisory station 112C. Communication between the computer 124 and the network controller 122 is accomplished in accordance with the EIA specification RS232.

Network controller 122 polls station 112A, 112B, etc. to determine if communication between any one of these remote stations and supervisory station 112C is to be established. For example, if a user at one remote station wishes to send a digital message to the supervisory station, an indication thereof is detected during this polling operation; and digital link 114 then may be restricted for communication between supervisory station 112C and that one remote station desiring communication therewith. In accordance with conventional techniques, the particular address of that remote station (or some other suitable identification, such as a security code) may be used as an identifier to permit communication via digital link 114 only from and to that station.

One type of communication between supervisory station 112C and a particular remote station contemplates the transmission of a specific message, known as a text message, from the remote station to the supervisory station. For example, in the network with which the present invention is intended to be used, it may be established that the supervisor is to be advised when a particular user is engaged in conference and should not be disturbed. To this effect, a particular one of keys 106 in telephone module 18 of a user's station might be predetermined and programmed such that, upon the operation of that key, a suitable message, for example, "Please do not disturb Mr. Smith", is displayed at supervisory station 112C. More particularly, when key 106 is depressed, an indication that the remote station wishes to communicate with the supervisory station is detected during the aforementioned polling operation, and an indication of the actuation of this key then is transmitted from the remote station to the supervisory station whereat such key actuation is detected with the resultant message displayed. Other messages may be associated with other ones of keys 106.

As another example, the supervisory operator may operate computer 124 to transmit a message to a specific remote station, such as "Please call Mr. Smith" or "Please see Mr. Jones" etc. This message is transmitted via digital link 114 to the particular remote station that is identified by the supervisory operator, whereat this message may be stored in memory 56 of microprocessor 54 included in telephone module 18 of that remote station. As a result, the stored message may be displayed on display 30 of the telephone module. It is appreciated that a proper identification is provided of the specific remote station to which this message is transmitted, thus precluding this message from being received at any other station. For example, the supervisory operator might actuate a keyboard to enter the identification or security code associated with the desired remote station, thereby limiting the transmitted message only to the identified station.

As another example, a so-called "master" telephone directory might be prepared by the supervisory operator, such as by operating the keyboard associated with computer 124. This master directory, which identifies individuals and their respective telephone numbers (which might comprise multi-digit telephone numbers, including area code and telephone exchange or, alternatively, might be limited solely to telephone extensions in an intra-office environment), is represented by data which, in turn, is transmitted via network controller 122 to all of the remote stations. In one embodiment, a "general" identification is used to permit the reception of this data by all of the remote stations, either simultaneously or, alternatively, in seriatum station-by-station. Such data is supplied via digital link 114 through network interface 120 to memory 56 of microprocessor 54 included in telephone module 18. It will be appreciated that this data is suitably identified, either by appropriate prefix codes or otherwise, so as to be stored in any desired portion of memory 56 in which telephone directory information is intended to reside. Thus, uniform telephone directory information may be generated, transmitted and stored in each telephone module having the same effect as if that telephone directory information was generated locally under the control of keyboard 28 of telephone module 18.

Alternatively, particular telephone directory information may be generated by the supervisory operator and transmitted only to a predetermined remote station which is identified by suitable identification or security codes, as mentioned above, thus permitting only that remote station to receive the transmitted telephone directory information. Here too, such information is received and stored in memory 56 of telephone module 18 at the designated station.

The reverse of the foregoing telephone directory transfer operation may be carried out. That is, telephone directory information that is stored in memory 56 of telephone module 18 at a particular remote station may be "uploaded" into computer 124. For the purpose of the present description, the manner in which this telephone directory is created and stored in memory 56 is not essential. It will be appreciated that this directory information may be created by the operation of keyboard 28 or, alternatively, by the transfer of directory information from a tape cassette via record/playback circuitry 68 in module 12, and other suitable recognition and encoding circuitry, to memory 56 of module 18. Such stored telephone directory information may be transferred from that memory to computer 124 by, for example, a request for communication made by the remote station which, when granted by computer 124 at supervisory station 112C permits such telephone directory information to be transmitted via digital link 114. It will be appreciated that an overall telephone directory may be amassed by computer 124 in response to the individual telephone directory information that is transmitted thereto from each remote station. If desired, a separate one of keys 106 in telephone module 18 may be designated a directory-transfer key to effect a directory uploading operation in the aforesaid manner upon its actuation.

The interconnection of supervisory station 112C with the illustrated remote stations facilitates a monitoring of, for example, telephone usage at each station. For instance, when a particular telephone module is placed "off hook" to initiate a telephone call, such off hook condition might be communicated to supervisory station 112C during the aforementioned polling operation. At the same time, the actual time of day and particular identification of the off hook station might be communicated. Typically, data representing time of day and on/off hook may be stored in memory 56 of telephone module 18 and, thus, transferred via microprocessor 54 to network interface 120 and, thence, to supervisory station 112C via digital link 114. As a result of this information, the duration of telephone calls and the identities of the parties who made them may be registered.

Similarly, in the event that telephone module 18 together with recording/playback module 12 are utilized as a telephone answering machine, information regarding the number of incoming messages which are recorded and the time of day (and, optionally, the duration) of each message may be communicated automatically to supervisory station 112C.

In one embodiment of this invention, if messages are recorded on recording/playback module 12 by use of the handset provided at telephone module 18, microprocessor 54 may supply to memory 56 information regarding the duration of each such message, the type of message recorded, the time of day it was recorded and the identity of the individual who recorded that message. Such data then may be transferred to and stored in computer 124.

Voice lines 116 permit each remote station to transmit information via telephone switchboard 118 to any conventional telephone network, such as to a telephone central office, to a PBX, etc. It will be appreciated that voice lines 116 and digital link 114 are independent. Thus, a telephone conversation may be carried on from a particular telephone module via voice lines 116 while, at the same time, messages or other digital data may be communicated between that same remote station and supervisory station 112C via digital link 114. Of course, telephone switchboard 118 may operate to interconnect the telephone modules of remote stations, such as remote stations 112A and 112B, remote stations 112A and 112D, etc.

If desired, a conventional modem may be connected to telephone module 18 of supervisory station 112C such that digital data may be transmitted from computer 124 to a remote site via voice lines 116. Likewise, a modem may be connected to telephone module 18 in any desired remote station to permit other digital equipment (not shown) to communicate via that modem and voice lines 116 to any further location.

Figure 9:
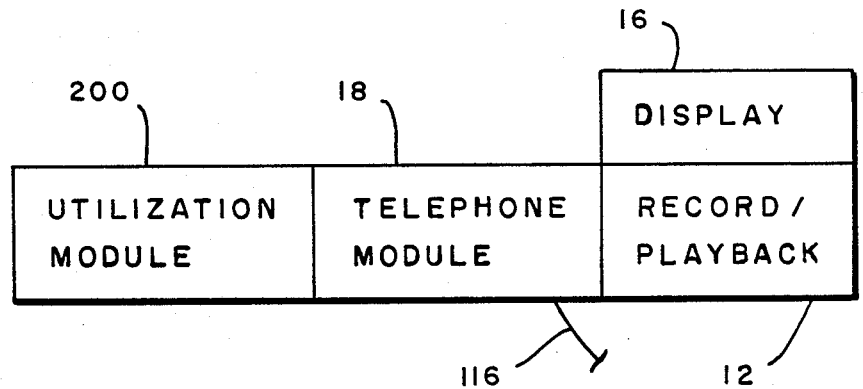
FIG. 9 is a block diagram of a further embodiment of a modular communication system in accordance with the present invention.

FIG. 9 is a block diagram of a modular communication system in accordance with the teachings of the present invention. Recording/playback module 12, display module 16 and telephone module 18 all have been described in detail hereinabove and are represented merely as blocks. Telephone module 18 is coupled to a voice line 116 to permit the bi-directional communication of audio signals between the telephone module and a remote location coupled to the voice line, such as a remote location connected via a conventional telephone network. A utilization module 200 is coupled to telephone module 18. The coupling between the modules may be similar to the coupling between telephone module 18 and recording/playback module 12, which is shown in FIG. 6 and described hereinabove.

Utilization module 200 may comprise a facsimile machine for recording, or printing text information transmitted thereto from a remote location via data-modulated audio signals. It is appreciated that such data-modulated audio signals are transmitted from the remote location to telephone module 18 via voice lines 116 and thence from the telephone module to the facsimile machine. When using the coupling shown in FIG. 6, it is recognized that such data-modulated audio signals are coupled to the facsimile machine from interface 66 (included in the telephone module) through switches 62, lines 60 and switches similar to switches 62 shown in recording/playback module 12 (FIG. 6.). It will be further appreciated that the facsimile machine and, more generally, utilization module 200, includes a microprocessor similar to microprocessor 54 shown in each of the respective modules of FIG. 6. This microprocessor provided in the utilization module functions to permit that module to receive data-modulated audio signals from voice lines 116. Once these signals are received by, for example, the facsimile machine embodiment of utilization module 200, the data-modulated audio signals are demodulated and used to record viewable images.

Conversely, the facsimile machine may cooperate with telephone module 18 to transmit image signals, representing a scanned document, to a remote location via voice lines 116. Such image signals may be generated in a manner known to those of ordinary skill in the art; and the image signals preferably modulate audio signals for transmission over the voice lines. Thus, the facsimile machine may receive or transmit signals representing viewable images so as to reproduce a document located at a remote location or cause a document to be reproduced on a facsimile device disposed at that remote location.

Utilization module 200 alternatively may comprise a modem adapted to be connected to a source of data, such as a digital computer, whereby data may be communicated between the modem and voice lines 116 via telephone module 18. Still further embodiments of utilization module 200 include a display device, such as a CRT, for displaying images derived from the remote location coupled to voice lines 116. As still another embodiment thereof, the utilization module may comprise a telephone-coupled printer for receiving data signals transmitted thereto from the remote location over voice lines 116 and through telephone module 18 so as to be printed at the telephone-coupled printer. It will be appreciated that other devices may be employed as the utilization module for use or cooperation with voice lines 116.

Figure 10:
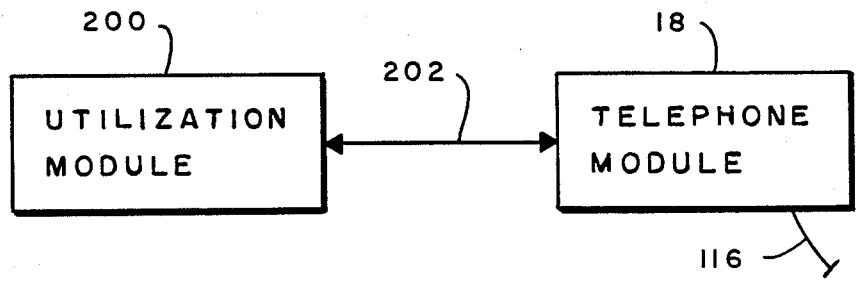
FIG. 10 is a block diagram of a still further embodiment of such a modular communication system.

FIG. 10 represents yet another embodiment of a modular communication system utilizing the teachings of the present invention. In the embodiment of FIG. 10, utilization module 200 is coupled via a cable 202 to telephone module 18. That is, the integral, physical coupling between the utilization module and the telephone module, as represented by FIG. 9, is replaced herein by cable 202. In all other aspects, the utilization module cooperates with the telephone module to communicate with a remote location via voice lines 116.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A modular dictation/transcription system comprising a plurality of physically independent modules each being connectable to one another to form an integral structure, said system comprising:
   a recording/playback module for recording and playing back messages;
   a display module connected to said recording/playback module for providing visual indications of data relating to the recording and playing back of messages in response to information particularly relating to selected ones of said messages recorded on said recording/playback module; and a telephone module connected to said recording/playback module for establishing a telephone link between the recording/playback module and a remote station on a telephone network.

2. A modular dictation/transcription system according to claim 1 further comprising means in each of the modules for communicating information bi-directionally between modules.

3. A modular dictation/transcription system comprising a plurality of physically independent modules each being connectable to one another to form an integral structure, said system comprising:

a first recording/playback module for recording and playing back messages;

a second recording/playback module connected to said first recording/playback module for recording and playing back messages;

a display module connected to said first recording/playback module for providing visual indications of data relating to the recording and playing back of messages in response to information particularly relating to selected ones of said messages recorded on said recording/playback modules; and a telephone module connected to said first recording/playback module for establishing a telephone link between the first and second recording/playback modules and a remote station on a telephone network.

4. A modular dictation/transcription system according to claim 3 further comprising means in each of the modules for communicating information bi-directionally between modules.

5. A modular dictation/transcription system comprising a plurality of physically independent modules each being connectable to one another to form an integral structure, said system comprising:

a first recording/playback module for recording and playing back messages;

a second recording/playback module connected to said first recording/playback module for recording and playing back messages; and display module connected to either said first or said second recording/playback module for providing visual indications of data relating to the recording and playing back of messages in response to further information particularly relating to selected ones of said messages recorded on said recording/playback modules.

6. A modular dictation/transcription system according to claim 5 further comprising means in each of the modules for communicating information bi-directionally between modules.

7. A modular dictation/transcription system comprising a plurality of physically independent modules each being connectable to one another to form an integral structure, said system comprising:

a recording/playback module for recording and playing back messages; and a telephone module connected to said recording/playback module for establishing a telephone link between the recording/playback module and a remote station connected to a telephone network; wherein, said system further comprises means in each of said modules in said system for communicating information bidirectional between each of said modules and any other module in said system.

8. A telephone module, including a handset, adapted for use in a modular communication system with one or more physically independent record/playback modules, the telephone module comprising:

telephone interface means for connecting the telephone module to a telephone line;

function select means manually operable to select a desired one of predetermined functions of the telephone module including voice communication with another module;

means for communicating information bi-directionally between the telephone module and each of the record/playback modules used therewith; and, control means for controlling the operation of the telephone module in response to the function select means and for communicating control information to at least one of the record/playback modules to control the record/playback module to record or playback messages over the telephone line when particular functions are selected and to record or playback messages over the handset when other particular functions are selected.

9. A telephone module according to claim 8 wherein said function select means includes programmable keyboard means for selecting programmable functions.

10. A telephone module according to claim 9 further comprising a display showing which of said functions programmed for said keyboard means has been selected.

11. A recording/playback module adapted for use in a modular dictation/transcription system with one or more other physically independent modules, each being connectable to the recording/playback module, the recording/playback module comprising:

audio recording means for storing and retrieving messages;

means for communicating information bi-directionally between the recording/playback module and each of said one or more other modules used therewith;

means for controlling the operation of the audio recording means either in response to information received from said one or more other modules used therewith or in response to control signals input by a user, whereby said recording/playback module may be operated either in said modular dictation/transcription system or as a stand-alone unit; and wherein, said information relates to the configuration status of said one or more other modules.

12. A recording/playback module according to claim 11 wherein one of said other modules is a second recording/playback module.

13. A recording/playback module according to claim 11 wherein said means for communicating information comprises a data bus.

14. A recording/playback module according to claim 11 wherein said means for communicating information comprises a serial communications link.

15. A recording/playback module adapted for use in a modular dictation/transcription system with one or more other physically independent modules, each being connectable to the recording/playback module, the recording/playback module comprising: audio recording means for storing and retrieving messages;

means for communicating information bi-directionally between the recording/playback module and each of said one or more other modules used therewith;

means for controlling the operation of the audio recording means either in response to information received from said one or more other modules used therewith or in response to control signals input by a user, whereby said recording/playback module may be operated either in said modular dictation/transcription system or as a stand-alone unit; and wherein, said means for communicating information comprises a data bus to which said recording/playback module and each of said one ore more other modules are connected, and microprocessor means included in said recording/playback module and in each of said one or more other modules for directing the transmission and reception of said information between said recording/playback module and said one or more other modules.

16. A recording/playback module according to claim 15 wherein said microprocessor means included in said recording/playback module responds to said information to be transmitted to select a predetermined one of said other modules which is to receive said information.

17. A recording/playback module according to claim 15 wherein said microprocessor means included in said recording/playback module is operative for polling modules of said system to detect which of said modules has information to be transmitted to said recording/playback module.

18. A recording/playback module according to claim 15 wherein said microprocessor means included in said recording/playback module senses when plural ones of said other modules seek to transmit information to said recording/playback module and enables a selected one of said other modules to transmit said information in accordance with an arbitration of signals on said data bus.

19. A display module adapted for use in a modular dictation/transcription system with one or more physically independent modules including a recording/playback module, said display module comprising:
a display;
means for communicating information bi-directionally between the display module and the recording/playback module;
control means for controlling the display in response to information received from said recording/playback module; and wherein,
said control means is further for communicating control information to said recording/playback module in response to search control signals input by a user of said dictation/transcription system so as to control said recording./playback module to playback a selected type of recorded message.

20. A display module adapted for use in a modular dictation/transcription system with one or more physically independent modules including a recording/playback module, said display module comprising:
a display;
means for communicating information bi-directionally between the display module and the recording/playback module;
control means for controlling the display in response to information received from said recording/playback module, and wherein,
each module of said system includes a microprocessor, the microprocessor of said display module communicating via said communicating means with the microprocessors of said one or more other modules for presenting data of dictation/transcription functions for display.

21. A modular dictation/transcription system comprising a plurality of physically independent modules each being connectable to one another to form an integral structure, said system comprising:
first and second recording/playback modules each for recording and playing back messages;
a telephone module connected to either said first or said second recording/playback module for establishing a communications link between the recording/playback modules and a remote station on a telephone network; and
means in each of said physically independent modules for communicating information bi/directionally between modules such that any one of said physically independent modules may transmit or receive information to or from another of said modules independently of other of said modules used therewith.

* * * * *